(12) United States Patent
Mitsui et al.

(10) Patent No.: US 9,448,430 B2
(45) Date of Patent: Sep. 20, 2016

(54) REFLECTIVE LIQUID CRYSTAL DISPLAY DEVICE AND ELECTRONIC APPARATUS PROVIDED THEREWITH

(71) Applicant: Japan Display Inc., Tokyo (JP)

(72) Inventors: Masashi Mitsui, Tokyo (JP); Yoko Fukunaga, Tokyo (JP)

(73) Assignee: Japan Display Inc., Tokyo (JP)

( * ) Notice: Subject to any disclaimer, the term of this patent is extended or adjusted under 35 U.S.C. 154(b) by 124 days.

(21) Appl. No.: 14/162,233

(22) Filed: Jan. 23, 2014

(65) Prior Publication Data

US 2014/0204296 A1    Jul. 24, 2014

(30) Foreign Application Priority Data

Jan. 24, 2013 (JP) .................................. 2013-011226

(51) Int. Cl.
    *G02F 1/1335* (2006.01)
(52) U.S. Cl.
    CPC ... *G02F 1/133504* (2013.01); *G02F 1/133553* (2013.01)
(58) Field of Classification Search
    CPC .............................................. G02F 1/133504
    See application file for complete search history.

(56) References Cited

U.S. PATENT DOCUMENTS

| | | | |
|---|---|---|---|
| 7,154,672 B2* | 12/2006 | Harada | 359/558 |
| 2002/0093612 A1* | 7/2002 | Maruyama et al. | 349/117 |
| 2010/0007823 A1* | 1/2010 | Haraguchi et al. | 349/98 |
| 2012/0320025 A1* | 12/2012 | Tamaki | 345/212 |

FOREIGN PATENT DOCUMENTS

| | | |
|---|---|---|
| JP | 2547416 | 8/1996 |
| JP | 2583519 | 11/1996 |
| JP | 2782200 | 5/1998 |

\* cited by examiner

*Primary Examiner* — Richard Kim
*Assistant Examiner* — Kendrick Hsu
(74) *Attorney, Agent, or Firm* — K&L Gates LLP

(57) ABSTRACT

A reflective liquid crystal display device includes a first substrate provided with a reflective electrode, a second substrate provided with a transparent electrode, a liquid crystal layer disposed between the first substrate and the second substrate, and an anisotropic scattering member formed on the second substrate. The anisotropic scattering member has first and second surfaces each including a first refractive index region and a second refractive index region having a refractive index different from that of the first refractive index region. A refractive index difference between the first refractive index region and the second refractive index region in the first surface is larger than that in the second surface. The anisotropic scattering member is disposed so that light enters from the first surface thereof and the light exits as scattered light from the second surface thereof. A phase difference is given to the light entered the anisotropic scattering member.

8 Claims, 22 Drawing Sheets

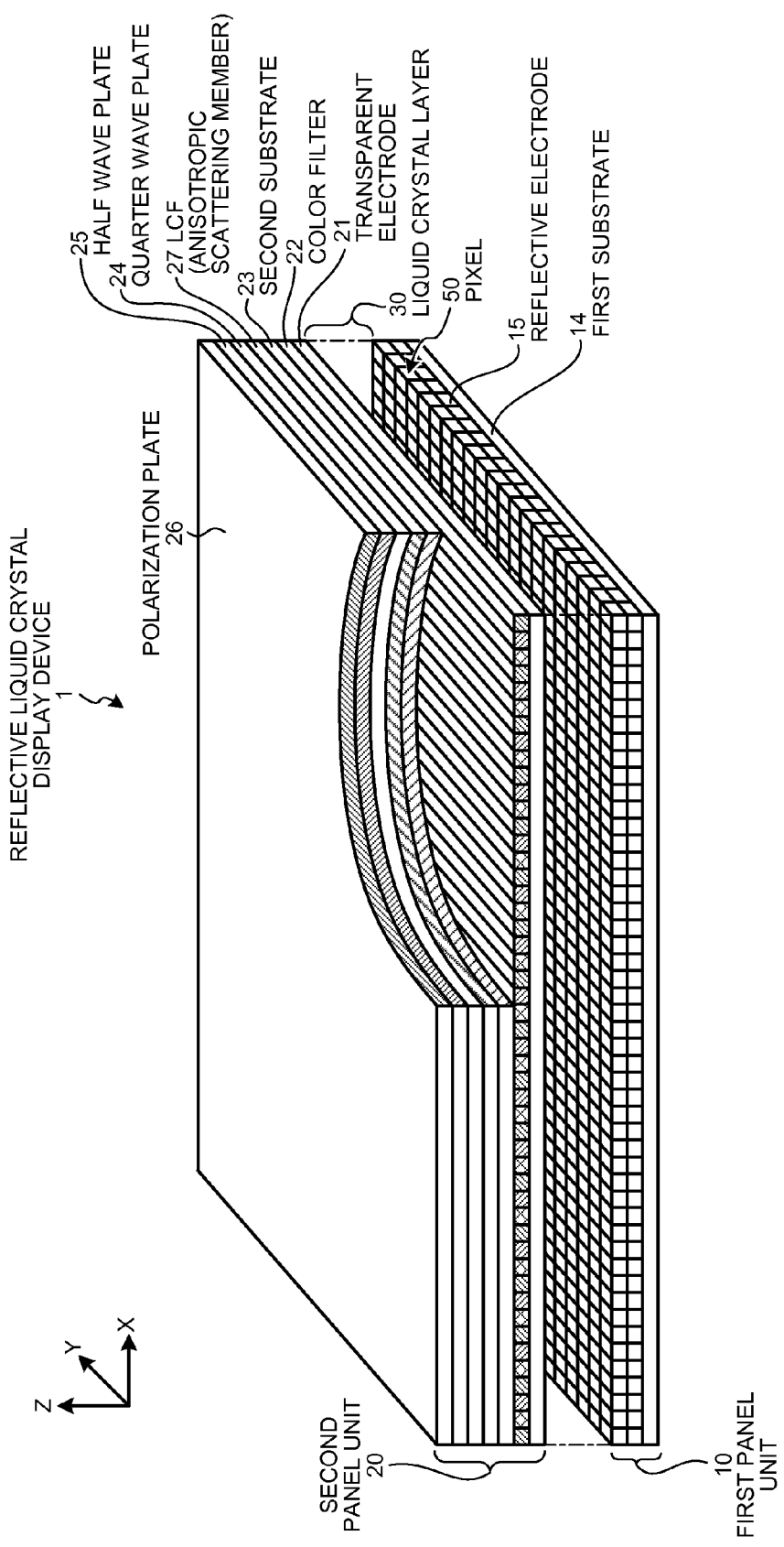

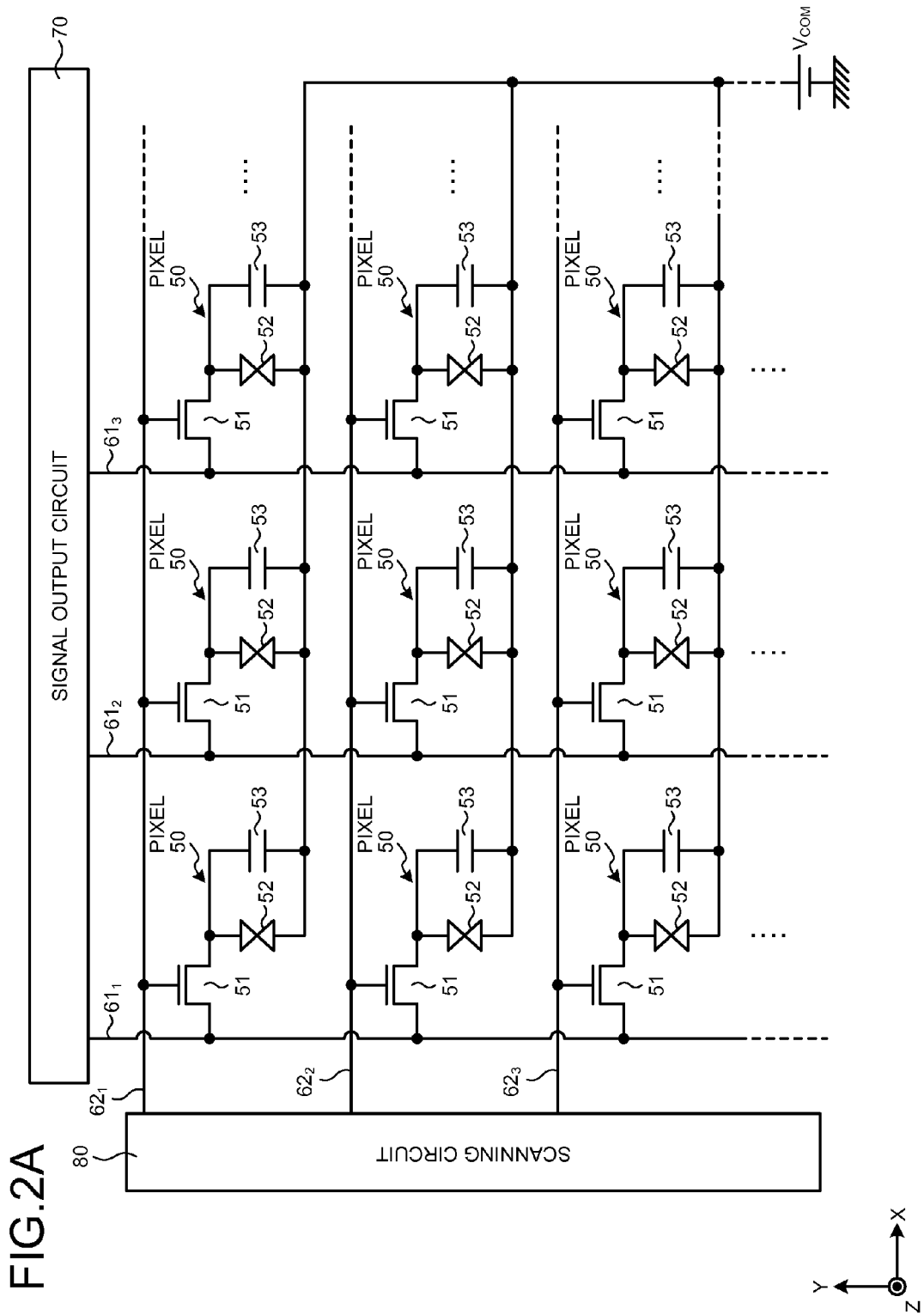

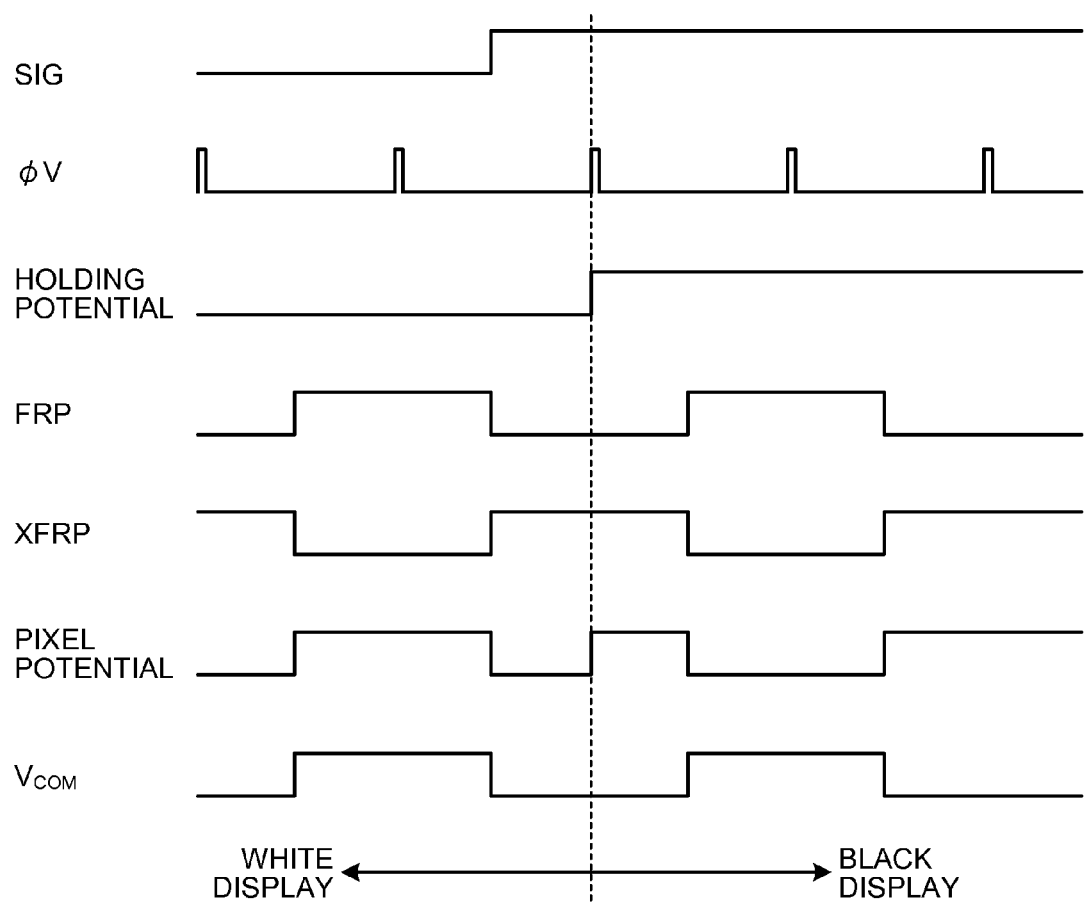

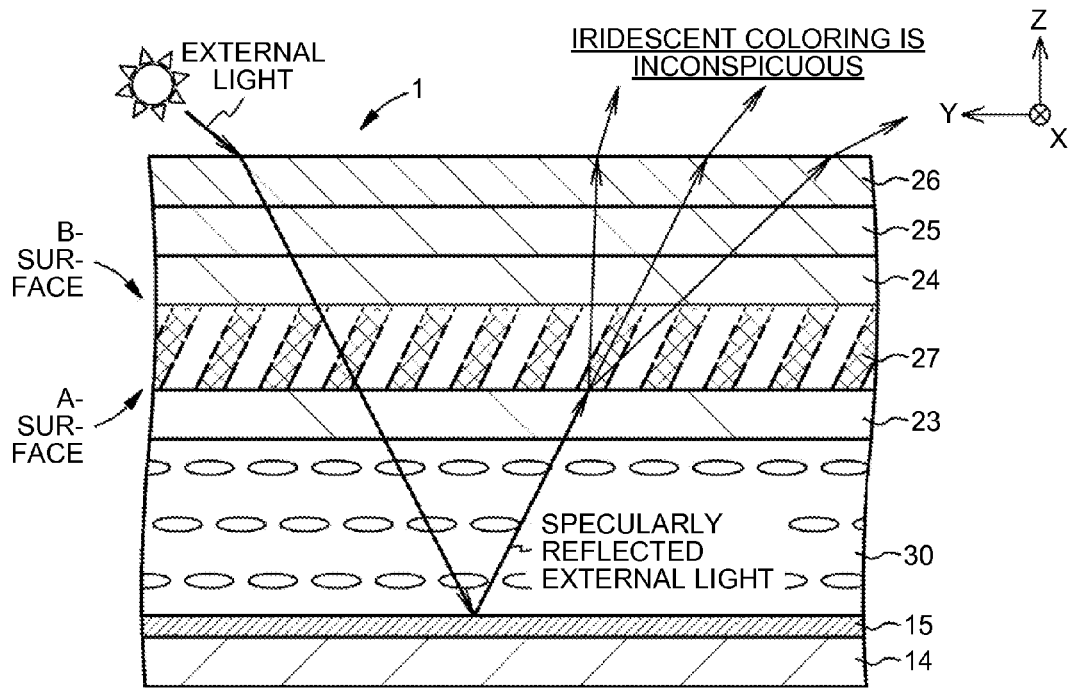
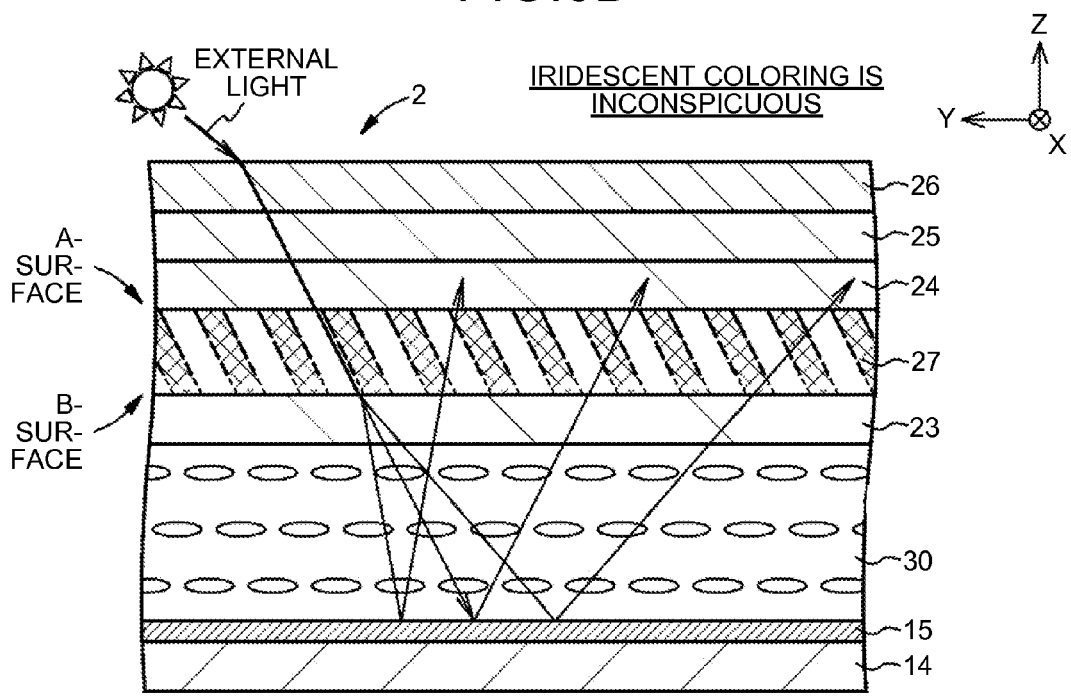

FIG.10
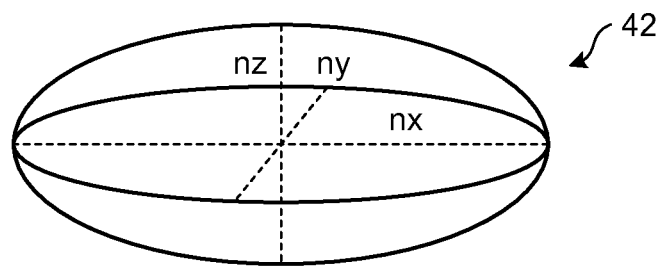
+
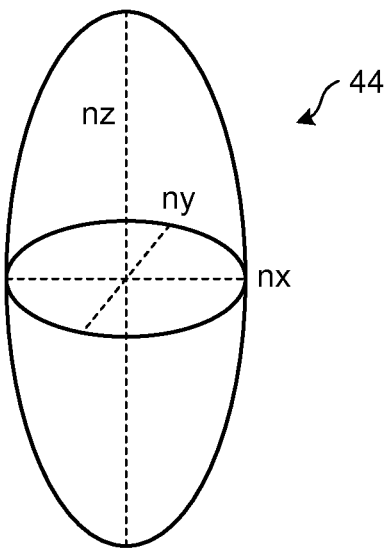

LCF WITH PHASE DIFFERENCE

LCF WITHOUT PHASE DIFFERENCE

SHUTTER BUTTON
114

LIGHT EMITTING UNIT
111

DISPLAY UNIT
112

SHUTTER BUTTON
114

113
MENU SWITCH

141 UPPER HOUSING
144 DISPLAY DEVICE
142 LOWER HOUSING

141 UPPER HOUSING
142 LOWER HOUSING

UPPER HOUSING
141

142
LOWER HOUSING

REFLECTIVE LIQUID CRYSTAL DISPLAY DEVICE AND ELECTRONIC APPARATUS PROVIDED THEREWITH

CROSS REFERENCES TO RELATED APPLICATIONS

The present application claims priority to Japanese Priority Patent Application JP 2013-011226 filed in the Japan Patent Office on Jan. 24, 2013, the entire content of which is hereby incorporated by reference.

BACKGROUND

1. Field of the Invention

The present invention relates to a reflective liquid crystal display (LCD) device and an electronic apparatus provided therewith.

2. Description of the Related Art

As a display device, there is known a reflective type display device for displaying an image using reflected light of incident light entered from outside, as well as a transmissive type display device for displaying an image using transmitted light of backlight from a rear surface of a screen. The reflective type display device has advantageous features such as low power consumption and viewable screen or monitor even in bright environment.

Furthermore, there is known a reflective type display device in which an LCF (Light Control Film) capable of increasing the reflection ratio (reflectance) of light is disposed between a polarization plate and a substrate disposed at a light emitting side than a liquid crystal layer, in order to improve an illuminance of an image (Japanese Patent No. 2782200, No. 2583519, and No. 2547416).

In the reflective type liquid crystal display (herein, also called reflective liquid crystal display or reflective LCD display as appropriate), light enters from various directions and the incident light is reflected. However, there is a restriction in improving the display contrast, because of a view angle characteristic of the liquid crystal. It may be possible to improve the display contrast by using a view angle compensation film in view of the view angle effect of the liquid crystal. However, a number of layers increases and thus a thickness of apparatus or device increases. Furthermore, the manufacturing cost increases, since the view angle compensation film is added.

SUMMARY

It is an object of the present invention to at least partially solve the problems in the conventional technology.

There is provided a reflective liquid crystal display device including a first substrate provided with a reflective electrode, a second substrate provided with a transparent electrode, the transparent electrode oppositely disposed to the reflective electrode and formed for each of a plurality of pixels, a liquid crystal layer disposed between the first substrate and the second substrate, and an anisotropic scattering member formed on the second substrate. The anisotropic scattering member has first and second surfaces each including a first refractive index region and a second refractive index region, the first refractive index region having a refractive index different from that of the second refractive index region. A refractive index difference between the first refractive index region and the second refractive index region in the first surface is larger than that in the second surface. The anisotropic scattering member is disposed so that light enters from the first surface thereof and the light exits as scattered light from the second surface thereof. A phase difference is given to the light entered the anisotropic scattering member.

There is provided an electronic apparatus provided with such a reflective liquid crystal display device.

In the reflective liquid crystal display device having the aforementioned structure, and the electronic apparatus provided with such a reflective liquid crystal display device, a phase difference is obtained by the anisotropic scattering member. Thereby, the view angle is compensated, and the display contrast is improved. Furthermore, the flexibility in designing an optical system of the reflective liquid crystal display device is improved. Therefore, since the phase difference is given by the anisotropic scattering member, it is possible to omit an independent optical component for compensating the view angle. Thus, the device structure is simplified and the low profile device can be obtained. Thereby the manufacturing cost is reduced.

The above and other objects, features, advantages and technical and industrial significance of this invention will be better understood by reading the following detailed description of presently preferred embodiments of the invention, when considered in connection with the accompanying drawings.

The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

Additional features and advantages are described herein, and will be apparent from the following Detailed Description and the figures.

BRIEF DESCRIPTION OF THE FIGURES

FIG. 1 is a partially cutout perspective view illustrating a general configuration of a reflective LCD device to which the present disclosure is applied;

FIG. 2A is a diagram illustrating a basic pixel circuit;

FIG. 5 is a timing chart illustrating an operation of the pixel employing the MIP technology;

FIG. 6C is a schematic sectional view illustrating a reflective image display unit according to the embodiment;

FIG. 6D is a schematic sectional view illustrating a reflective image display unit according to another embodiment;

FIG. 10 is a schematic view illustrating a relationship between the refractive index of the anisotropic scattering member and the refractive index of a liquid crystal layer;

DETAILED DESCRIPTION

Figure 2B:
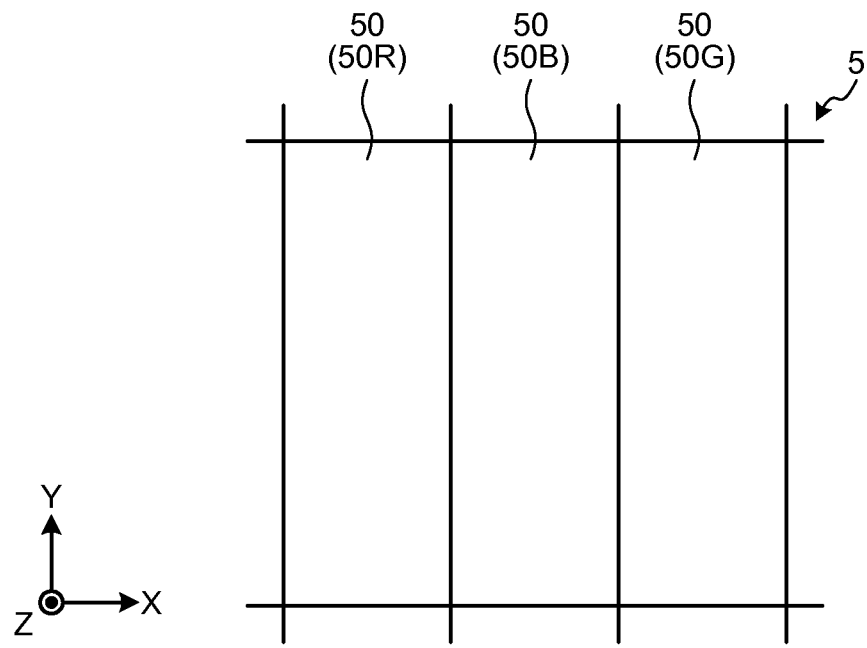
FIG. 2B is a schematic view illustrating a pixel in color display.

The present disclosure will now be described according to the following orders and with reference to the accompanying drawings.

1. Reflective LCD Device
1-1. Reflective LCD Device for Color Display
1-2. Fundamental Pixel Circuit
1-3. Pixel and Sub-pixel
1-4. Electrode Structure of Pixel portion
1-5. Driving Scheme of LCD Panel
1-6. Anisotropic Scattering Member
2. Electronic Apparatus
3. Configuration of Present Disclosure <1. Reflective LCD Device>

A technology in the present disclosure can be applied to a flat panel type display device. Examples of the flat panel type display device includes a display device using a liquid crystal display (LCD) panel, a display device using electro luminescence (EL) display panel, a display panel using a plasma display (PD) panel, and so on.

These flat panel type display devices can be classified into transmissive type and reflective type, according to display schemes. The technology in the present disclosure can be applied to a reflective display device. Furthermore, it is sufficient for the technology in the present disclosure to employ a structure for displaying an image using a light reflection from a reflective electrode. Therefore, the technology in the present disclosure can be also applied to a transflective liquid crystal display device having a feature of transmissive type display and a feature of reflective type display, specifically a transflective liquid crystal display which has a viewable screen or monitor both in a bright environment or in a dark environment and which can reduce the power consumption. In the technology of the present disclosure, thus, the reflective liquid crystal display device includes the transflective liquid crystal display device. The reflective liquid crystal display device is preferably used as a display unit of electronic apparatus, especially portable electronic apparatus likely to be used in on-the-go situation, i.e. mobile computing device including mobile information device such as digital camera or mobile communication device such as mobile phone. Herein, the reflective type liquid crystal display device may be also called "reflective liquid crystal display device" or "reflective LCD display" for the simplicity.

The reflective liquid crystal display device to which the present disclosure is applied may be a display device for displaying a monochrome image or may be a display device for displaying a color image. In the case of the color display, one pixel (unit pixel) which is a unit for composing a color image includes a plurality of sub-pixels. Specifically, in the display device for displaying a color image, the unit pixel may include three sub-pixels, for example, a sub-pixel displaying red (Red:R), a sub-pixel displaying green (Green:G), and a sub-pixel displaying blue (Blue:B).

However, one pixel is not limited to a combination of RGB three primary colors. For example, it is possible to form a unit pixel by adding one or more sub-pixels of one or more colors to the RGB three primary color sub-pixels. Specifically, for example, it is possible to form a unit pixel by adding at least one sub-pixel displaying white (White:W) in order to improve brightness or luminance. It is also possible to form a unit pixel by adding at least one sub-pixel displaying a complementary color in order to extend a color reproduction range.

[1-1. Reflective LCD Device for Displaying Color Image]

A reflective liquid crystal display device for displaying a color image will now be explained as an example of a reflective liquid crystal display device to which the present disclosure is applied, with reference to drawings.

As illustrated in FIG. 1, the reflective liquid crystal display device 1 to which the present disclosure is applied includes a first panel unit (TFT substrate) 10, a second panel unit (CF substrate) 20, and a liquid crystal layer 30, as primary components. In the reflective liquid crystal display device 1, a surface of the second panel unit 20 is a display surface side. The first panel unit 10 and the second panel unit 20 are oppositely disposed with a predetermined gap. The liquid crystal layer 30 is formed by sealing the gap with a liquid crystal material between the first panel unit 10 and the second panel unit 20.

The first panel unit 10 includes a first substrate 14 which is made of transparent material such as glass at an opposite side of the liquid crystal layer 30, and a reflective electrode 15 which is formed on the first substrate 14 at a side of the liquid crystal layer 30. The reflective electrode 15 is a part of sub-pixels 50.

In the first panel unit 10, a plurality of signal lines and a plurality of scanning lines are formed on the first substrate 14 such that these signal lines and scanning lines cross each other. At positions where the signal lines and the scanning lines cross, sub-pixels 50 are two-dimensionally arrayed in a matrix. Hereinafter, these sub-pixels 50 may be also called "pixels 50" for simplicity.

On the first substrate 14, circuit elements including a capacitative element and a switching element such as TFT (Thin Film Transistor) and the like are formed for each pixel 50. A planarization film is formed on these circuit elements, signal lines and scanning lines so that a surface of the first panel unit 10 is planarized. On the planarization film, the reflective electrode 15 is formed for each pixel 50. The reflective electrode 15 will be described later. The first substrate 14 may be also called TFT substrate, since the circuit elements including TFT are formed on the first substrate 14.

The plurality of signal lines are wiring for transmitting signals (display signal/video signal) to drive pixels 50. The signal lines have a wiring structure extending for each column of pixels 50 in the matrix array in a direction along which pixels in the column are arrayed, i.e. a column direction (Y-axis direction in FIG. 1). The plurality of scanning lines are wiring for transmitting signals (scanning signal) to select a row of pixels 50. The scanning lines have a wiring structure extending for each row of pixels 50 in the matrix array in a direction along which pixels in the row are arranged, i.e. a row direction (X-axis direction in FIG. 1). The X-axis direction and the Y-axis direction orthogonally cross each other.

The second panel unit 20 includes a transparent electrode 21 made of ITO (Indium Tin Oxide) or the like, a color filter 22, a second substrate 23 made of a transparent material such as glass, a quarter wave plate 24, a half wave plate 25, and a polarization plate 26 in this order from a side of the liquid crystal layer 30. In the second panel unit 20, an anisotropic scattering member 27 is disposed between the second substrate 23 and the quarter wave plate 24.

In the second panel unit 20, the color filter 22 has a structure in which stripe-shaped RGB filters extending in the column direction (Y-axis direction) are repeatedly arranged with a pitch or interval the same as a pitch or interval of the pixels 50 in the row direction (X-axis direction). The second substrate 23 may be also called CF (Color Filter) substrate, since the second substrate 23 includes the color filer 22.

The liquid crystal display panel is formed from the first panel unit 10, the second panel unit 20 oppositely disposed to the first panel unit 10, and the liquid crystal layer 30 disposed between the first panel unit 10 and the second panel unit 20. In the liquid crystal display panel, the upper surface of the second panel unit 20 is a display surface.

In the reflective liquid crystal display device 1 having the aforementioned structure, each pixel 50 has a reflective display area (reflective display portion) and a transmissive display area (transmissive display portion). As described above, the reflective display area includes the reflective electrode 15 formed for each pixel 50 on the surface of the planarization film of the first substrate 14, so that a light entered from outside through the second panel unit 20 is reflected from the reflective electrode and the reflected light is used for displaying an image.

[1-2. Fundamental Pixel Circuit]

Now, a fundamental pixel circuit of the pixel 50 will be described with reference to FIG. 2A. The X-axis direction in FIG. 2A corresponds to a row direction of the reflective liquid crystal display device 1 as illustrated in FIG. 1, and the Y-axis direction in FIG. 2A corresponds to a column direction of the reflective liquid crystal display device 1 as illustrated in FIG. 1.

As illustrated in FIG. 2A, the plurality of signal lines 61 ($61_1$, $61_2$, $61_3$, . . . ) and the plurality of scanning lines 62 ($62_1$, $62_2$, $62_3$, . . . ) are arranged so that these lines cross each other, and a pixel 50 is disposed at each cross section of these lines. A direction along which the scanning lines 62 ($62_1$, $62_2$, $62_3$, . . . ) extend is a row direction (X-axis direction), and a direction along which the signal lines 61 ($61_1$, $61_2$, $61_3$, . . . ) extend is a column direction (Y-axis direction). As described before, the signal lines 61 and the scanning lines 62 are formed on a surface of the first substrate (TFT substrate) 14 of the first panel unit 10. One end of each signal line 61 is connected to an output terminal of a signal output circuit 70, the output terminal provided in conformity with each column. One end of each scanning line 62 is connected to an output terminal of a scanning circuit 80, the output terminal provided in conformity with each line.

Each pixel 50 may have a structure in which a pixel transistor 51 using TFT, a liquid crystal capacity 52, and a holding capacity 53 are included. A gate electrode of the pixel transistor 51 is connected to the corresponding scanning line 62 ($62_1$, $62_2$, $62_3$, . . . ) and a source electrode of the pixel transistor 51 is connected to the corresponding signal line 61 ($61_1$, $61_2$, $61_3$, . . . ).

The liquid crystal capacity 52 represents a capacitive component of the liquid crystal material generated between a pixel electrode and an opposite electrode (corresponding to the transparent electrode 21 in FIG. 1) oppositely disposed to the pixel electrode. In that case, the pixel electrode is connected to a drain electrode of the pixel transistor 51. The pixel electrode corresponds to the reflective electrode formed for each sub-pixel in color display, and corresponds to the reflective electrode formed for each pixel in monochrome display. To the opposite electrode of the liquid crystal capacity 52, a common electric potential Vcom which is a DC voltage is applied commonly for all the pixels. One electrode of the holding capacity 53 is connected to the pixel electrode of the liquid crystal capacity 52 and the other electrode of the holding capacity 53 is connected to the opposite electrode of the liquid crystal capacity 52.

As apparently understood from the aforementioned pixel circuit, the plurality of signal lines 61 ($61_1$, $61_2$, $61_3$, . . . ) are wiring for transmitting signals to drive pixels 50, that is, wiring for transmitting video signals output from the signal output circuit 70 to pixels 50 for each pixel column. Furthermore, the plurality of scanning lines 62 ($62_1$, $62_2$, $62_3$, . . . ) are wiring for transmitting signals to select a row of pixels 50, that is, wiring for transmitting scanning signals output from the scanning circuit 80 to each pixel TOW.

[1-3. Pixel and Sub-Pixel]

Figure 2C:
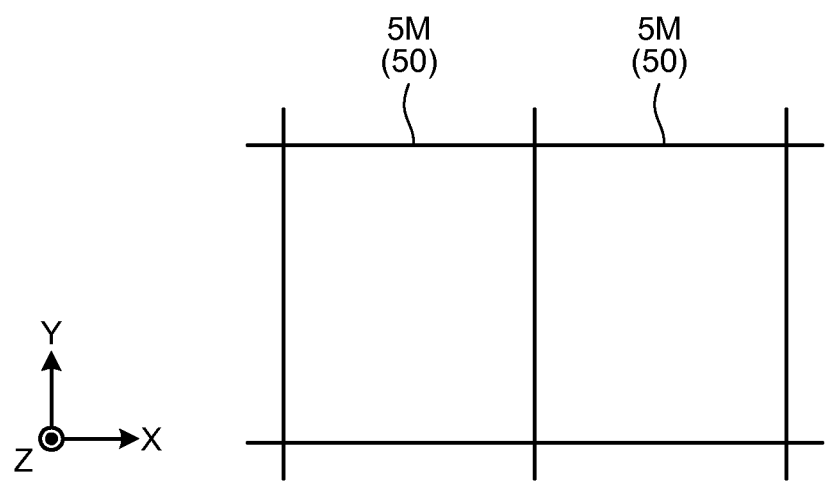
FIG. 2C is a schematic view of a pixel in monochromatic display.

In a case where the reflective liquid crystal display device 1 is capable of displaying a color image, one pixel (i.e. a unit pixel 5) which is a unit for forming a color image may include a plurality of sub-pixels 50 as illustrated in FIG. 2B. In this example, the unit pixel 5 includes a sub-pixel 50R for displaying R, a sub-pixel 50B for displaying B, and a sub-pixel 50G for displaying G. The sub-pixels 50R, 50B, and 50G included in the unit pixel 5 are aligned in X-axis direction that is a row direction of the reflective liquid crystal display device 1. As described above, the unit pixel 5 may include one or more sub-pixels of one or more colors. In a case where the reflective liquid crystal display device 1 is capable of displaying a monochrome image only, one pixel (i.e. a unit pixel 5M) which is a unit for forming a monochrome image is a pixel 50 (corresponding to the sub-pixel 50 in the color image), as illustrated in FIG. 2C. The unit pixel 5 is a basic unit for displaying a color image, and a unit pixel 5M is a basic unit for displaying a monochrome image.

[1-4. Electrode Structure of Pixel Portion]

Now, an electrode structure of the pixel 50 will be described prior to the explanation of the transmissive display area.

Figure 3:
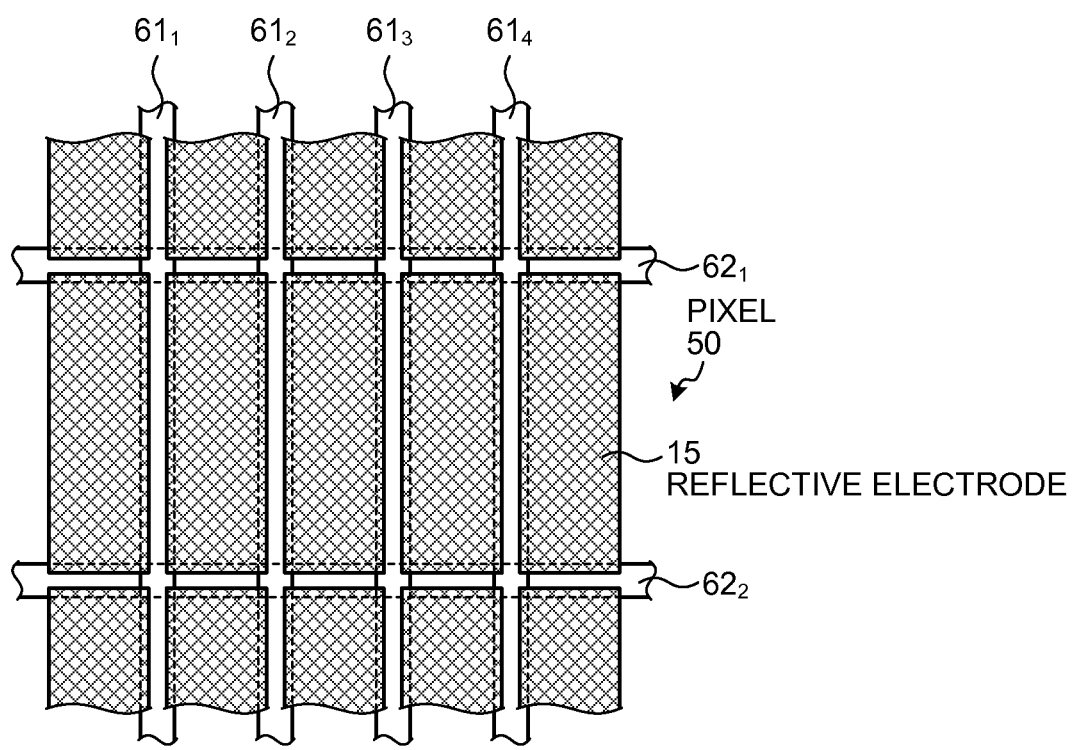
FIG. 3 is a plan view illustrating a pixel portion of the reflective liquid crystal display device.

FIG. 3 is for illustrating an electrode structure of the pixel portion. FIG. 3 is a plan view illustrating a pixel portion of a reflective (total reflective) type liquid crystal display device. In FIG. 3, the reflective electrode 15 is depicted with hatching.

As illustrated in FIG. 3, in the pixel portion of the reflective liquid crystal display device 1, the pixels 50 are arrayed in a matrix. The signal lines 61 extend along a column direction in spaces between the adjacent pixels 50 and the scanning lines 62 extend along a row direction in spaces between the adjacent pixels 50. As described above, the signal lines 61 and the scanning lines 62 are disposed or arranged so that they cross each other on the first substrate 14 of the first panel unit 10 in FIG. 1.

In the pixel portion (pixel array portion) having such a structure, when applied to the reflective liquid crystal display device 1 as illustrated in FIG. 1, the reflective electrode 15 made of a metal such as aluminum is formed as big as a size of pixel 50. An area or region of the reflective electrode 15 is a reflective display area. Namely, the reflective liquid crystal display device 1 obtains a desired reflective display performance or function by assuring the reflective display area as big as a size of the pixel 50.

[1-5. Driving Scheme of LCD Panel]

In LCD panels or LCD devices, in order to prevent a deterioration of a specific resistance (a resistance value specific to a material) of liquid crystal because of the continuous application of direct voltage of a same polarity, the polarity of video signal is inverted with a predetermined period on the basis of the common electric potential Vcom.

As such a driving scheme of LCD panel, there are known various schemes including line inversion, dot inversion, frame inversion and the like. The line inversion is a driving scheme in which a polarity of a video signal is inverted with 1H period (H means a horizontal period) which corresponds to one line (one pixel line). The dot inversion is a driving scheme in which a polarity of a video signal is alternately inverted for every pixel adjacent each other in up and down direction, and left to right direction. The frame inversion is a driving scheme in which a polarity of video signals to be given to all the pixels in one frame which corresponds to one screen is inverted together.

When the frame inversion is employed for the reflective LCD device 1, the signal voltage of the same polarity is given to the signal line during one frame period. As a result, shading may occur. Therefore, when the frame inversion is employed in the reflective LCD device 1, a pixel having a memory function is employed as the pixel 50. Specifically, so-called "MIP (Memory in Pixel)" technology is employed in which each pixel is provided with a memory capable of storing data. In the case of the MIP technology, a constant voltage is always applied to the pixels 50. Thereby, the shading can be reduced.

In the MIP technology, owing to pixels each having a memory to store data therein, it is possible to realize an analog display mode and a memory display mode. The analog display mode is a display mode to analogically display a gradation of pixels. The memory display mode is a display mode to digitally display a gradation of pixels on the basis of binary information (logical "1"/logical "0") stored in memories in pixels.

In the memory display mode, since information stored in memories is used, there is no need to perform a writing operation of signal voltage reflecting a gradation every frame period. Therefore, in comparison with the analog display mode involving a writing operation of signal voltages reflecting a gradation with a frame period, the memory display mode can reduce the power consumption. In other words, the power consumption of the reflective LCD apparatus 1 can be reduced.

Figure 4:
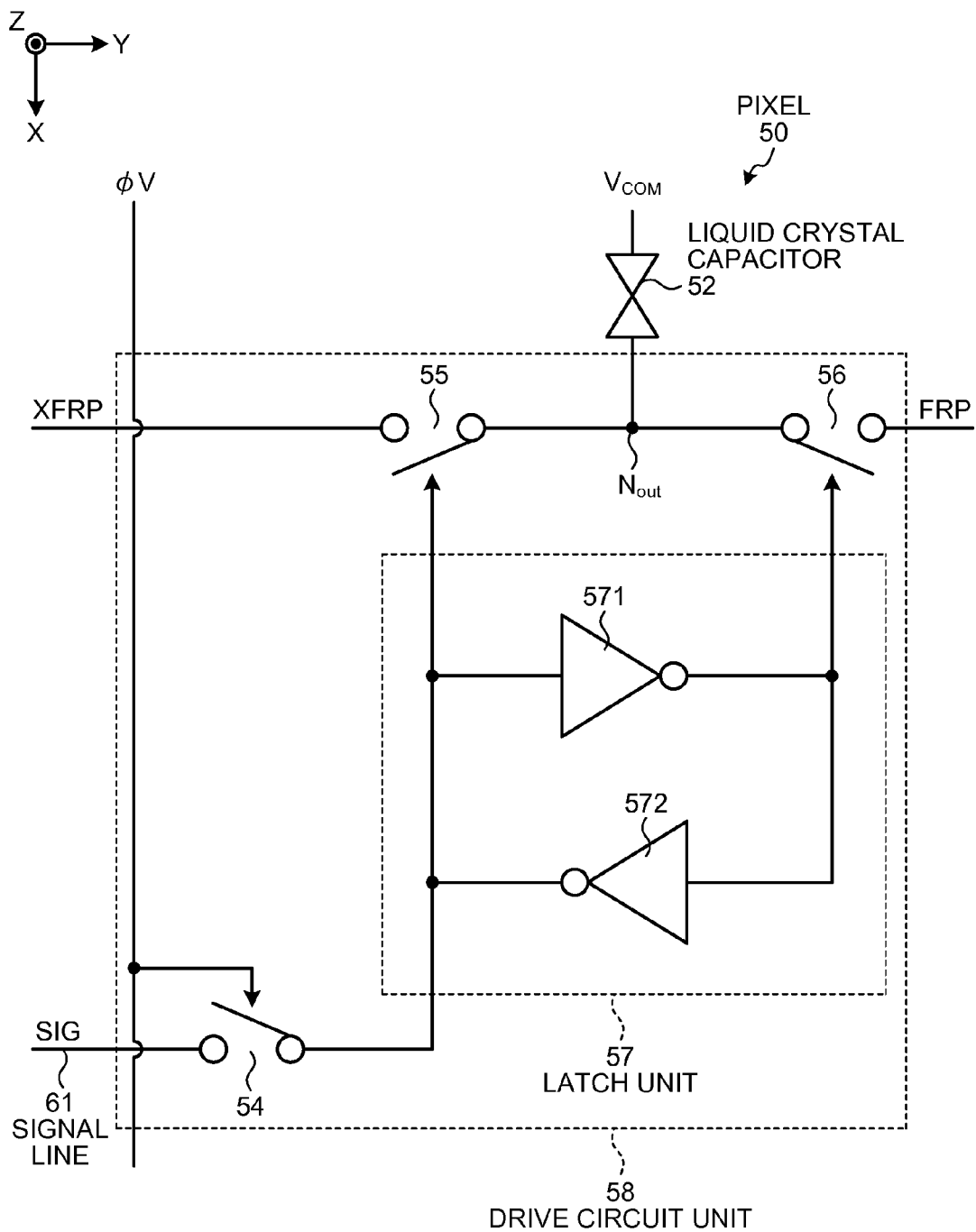
FIG. 4 is a block diagram illustrating an example of a circuit configuration of a pixel employing the MIP technology.

FIG. 4 is a block diagram illustrating an example of a circuit configuration of a pixel employing the MIP technology. In FIG. 4, components or elements corresponding to components or elements in FIG. 2A carry the same reference numerals. FIG. 5 is a timing chart illustrating an operation of pixel employing the MIP technology.

As illustrated in FIG. 4, the pixel 50 includes a drive circuit 58 having three switching elements 54, 55, 56 and a latch unit 57, in addition to the liquid crystal capacity (liquid crystal cell) 52. The drive circuit unit 58 is provided with a SRAM (Static Random Access Memory) function. The pixel 50 provided with the drive circuit unit 58 has a pixel structure having the SRAM function. The liquid crystal capacity (liquid crystal cell) 52 represents the liquid crystal capacity generated between the pixel electrode (e.g. the reflective electrode 15 in FIG. 3) and the opposite electrode oppositely disposed thereto.

One end of the switching element 54 is connected to a signal line 61 (corresponding to signal lines $61_1$ to $61_3$ in FIG. 2A). The switching element 54 is turned on (closed state) when a scanning signal ø V from the scanning circuit 80 (FIG. 2A) is given to the element 54. In that state, data SIG supplied from the signal output circuit 70 (FIG. 2A) through a signal line 61 is taken into the drive circuit unit 58. The latch unit 57, which includes inverters 571, 572 reversely arranged in parallel, latches an electric potential corresponding to the data SIG taken through the switching element 54.

A control pulse XFRP having an inverted phase of the common electric potential Vcom is applied to one end of the switching element 55. A control pulse FRP having a same phase of the common electric potential Vcom is applied to one end of the switching element 56. Other end of the switching element 55 and other end of the switching element 56 are commonly connected so that a common connection node thereof becomes an output node Nout of this pixel circuit. Either the switching element 55 or the switching element 56 is turned on depending on the polarity of the holding electric potential of the latch unit 57. Thereby, the control pulse FRP or XFRP is applied to a pixel electrode (e.g. the reflective electrode 15 in FIG. 3) of the liquid crystal capacity 52 having an opposite electrode (e.g. the transparent electrode 21 in FIG. 1) to which the common electric potential Vcom is applied.

As clearly understood from FIG. 5, in this example, if the holding electric potential of the latch unit 57 has a negative polarity, the pixel electric potential of the liquid crystal capacity 52 has the same phase as the common electric potential Vcom. Thereby, white is displayed. If the holding electric potential of the latch unit 57 has a positive polarity, the pixel electric potential of the liquid crystal capacity 52 has the inverted phase of the common electric potential Vcom. Thereby, black is displayed.

Apparently from the aforementioned explanation, in the pixel 50 of the MIP technology, either the switching element 55 or the switching element 56 is turned on depending on the polarity of the holding electric potential of the latch unit 57, so that the control pulse FRP or XFRP is applied to the pixel electrode (e.g. the reflective electrode 15 in FIG. 3) of the liquid crystal capacity 52. As a result, a constant voltage is always applied to the pixel 50. Thereby, the shading can be prevented.

In this example, an explanation is made on a case where the SRAM is used as a memory built in the pixel 50. However, this is not exclusive, and other memory such as DRAM (Dynamic Random Access Memory) may be employed.

In the present embodiment, when the MIP technology is employed, an area coverage modulation method, a time division modulation method, and the like may be used. In the time division modulation method, the pixel electric potential varies with time even in a static image, and liquid crystal molecules move in the pixel and among the pixels. Therefore, the area coverage modulation method may be preferably used rather than the time division modulation method. In the area coverage modulation method, gaps among the electrodes increase because the pixel electrode, which is the reflective electrode 15, is divided. Accordingly, it is advantageous that the transmittance of the panel is higher than in a case where the pixel electrode is not divided.

In the above example, the pixel using the MIP technology in which a memory capable of storing therein the data for each pixel is used as the pixel having the memory function, but the embodiment is not limited thereto. Examples of the pixel having the memory function include the pixel using well-known memory-type liquid crystal in addition to the pixel using the MIP technology.

The display mode of the liquid crystal includes a normally white mode in which white is displayed when an electric field (voltage) is not applied and black is displayed when the electric field is applied, and a normally black mode in which black is displayed when the electric field is not applied and white is displayed when the electric field is applied. In both modes, the liquid crystal cell has the same structure, and has different arrangements of the polarizing plate 26 in FIG. 1. The reflective liquid crystal display device 1 according to the embodiment is driven in the normally white mode in which white is displayed when the electric field (voltage) is not applied and black is displayed when the electric field is applied.

[1-6 Anisotropic Scattering Member]

Figure 6A:
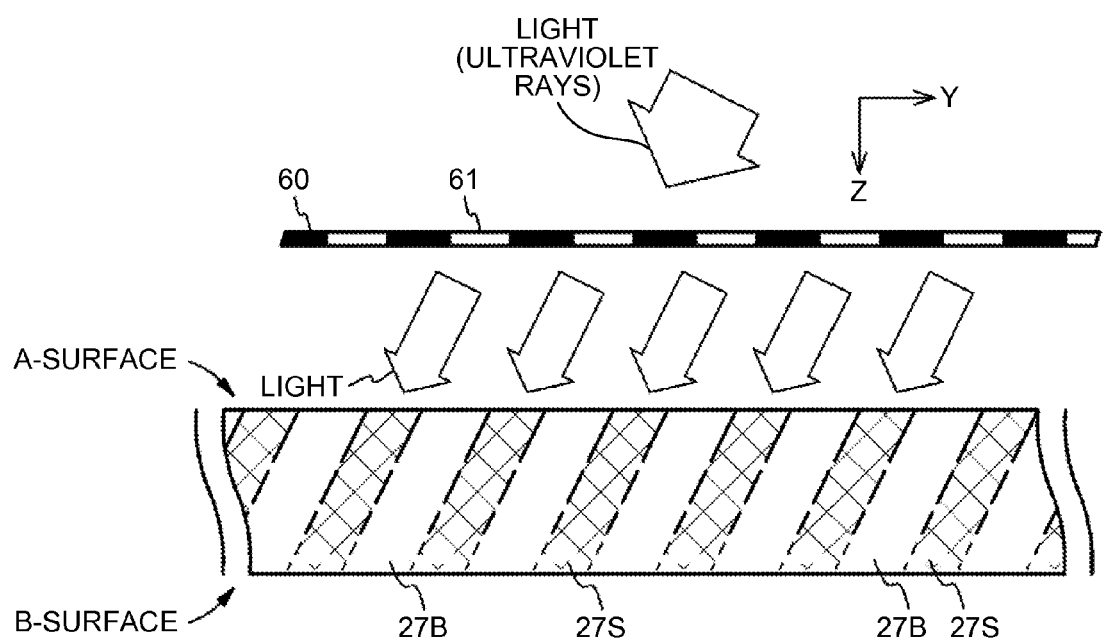
FIG. 6A is schematic view for explaining a method for manufacturing the anisotropic scattering member according to the embodiment.
Figure 6B:
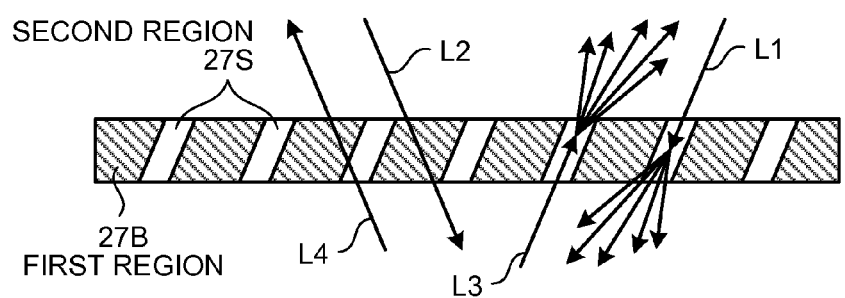
FIG. 6B is a cross-sectional view illustrating an anisotropic scattering member.
Figure 7:
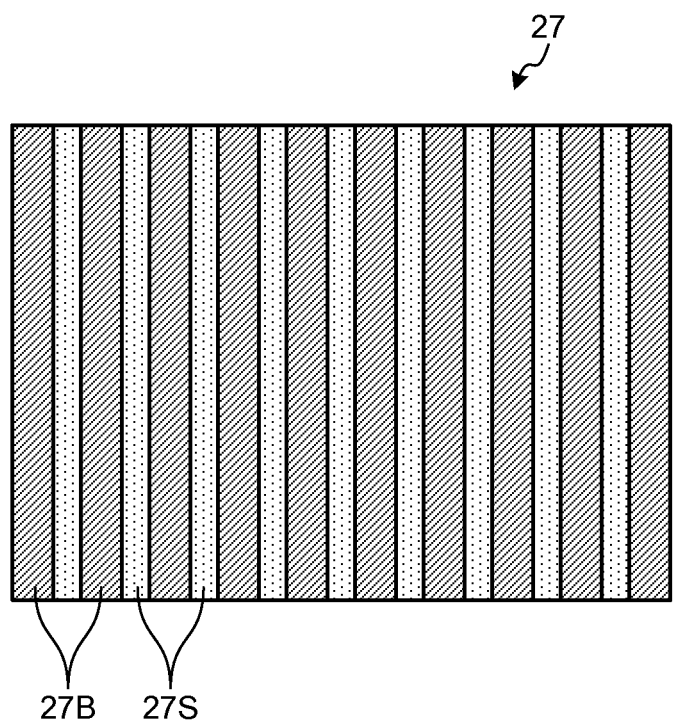
FIG. 7 is a plan view illustrating an example of the anisotropic scattering member.
Figure 8:
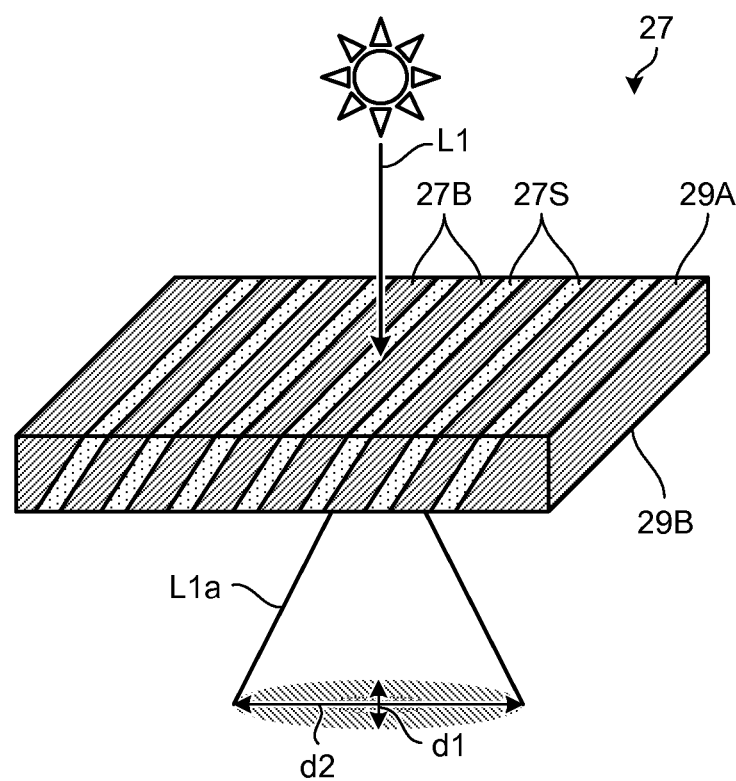
FIG. 8 is a schematic view illustrating a function of the anisotropic scattering member.
Figure 9:
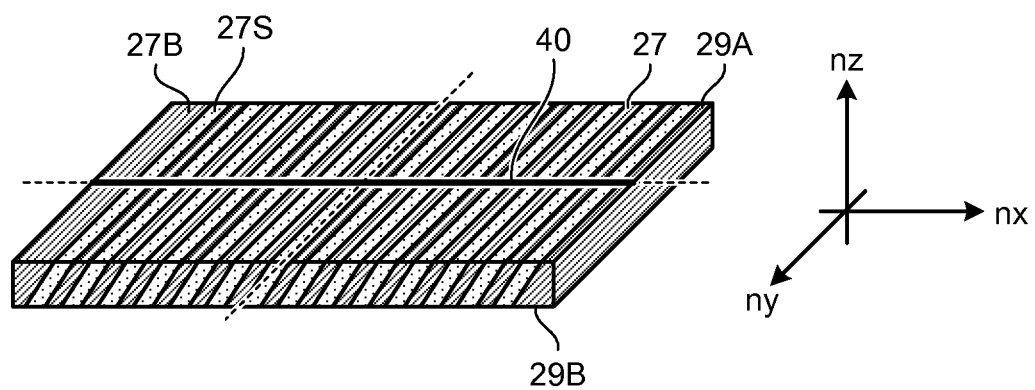
FIG. 9 is a schematic view illustrating a relationship between the anisotropic scattering member and the axes of refractive indexes.

FIG. 6A is schematic view for explaining a method for manufacturing the anisotropic scattering member according to the embodiment. FIG. 6B is a cross-sectional view illustrating an anisotropic scattering member. FIG. 6C is a schematic sectional view illustrating a reflective image display unit according to the embodiment. FIG. 6D is a schematic sectional view illustrating a reflective image display unit according to another embodiment. FIG. 7 is a plan view illustrating an example of the anisotropic scattering member. FIG. 8 is a schematic view illustrating a function of the anisotropic scattering member. FIG. 9 is a schematic view illustrating the relation between the anisotropic scattering member and the axes of a refractive index.

Figure 11:
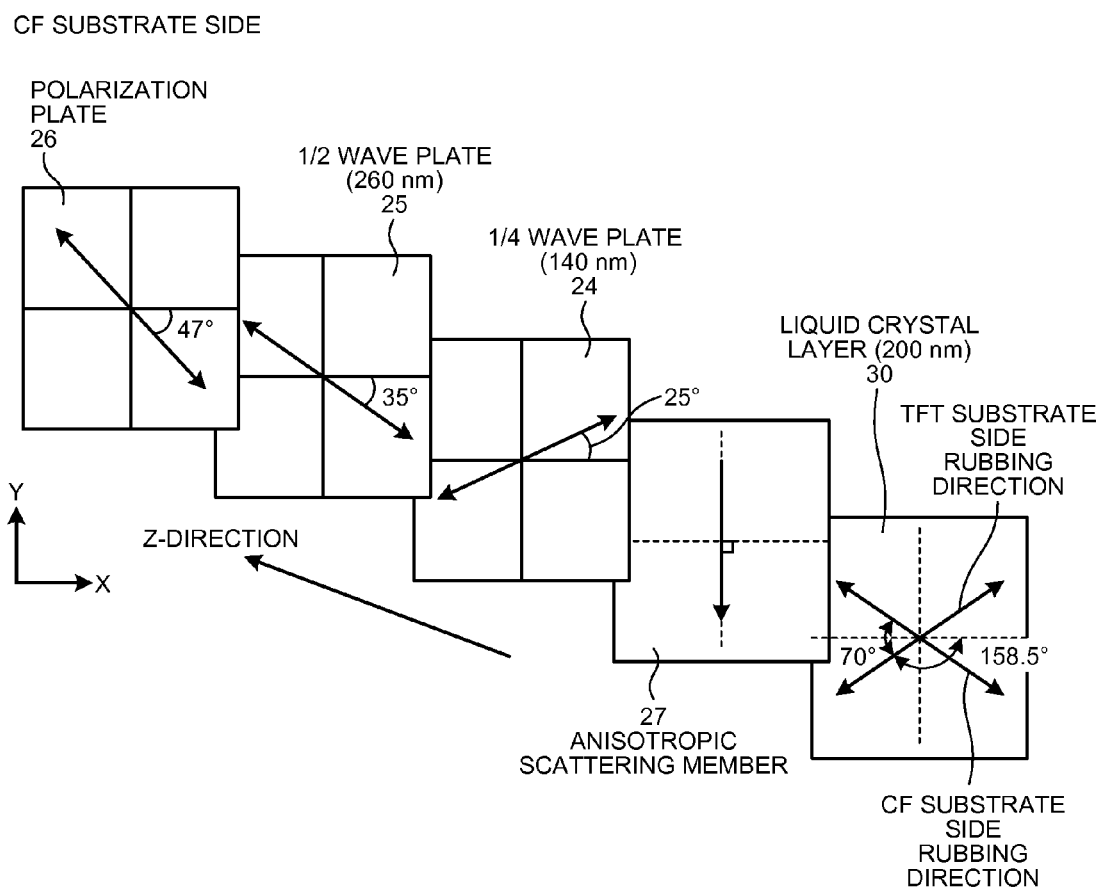
FIG. 11 is a schematic view illustrating an example of an optical design of the reflective liquid crystal display device.
Figure 12:
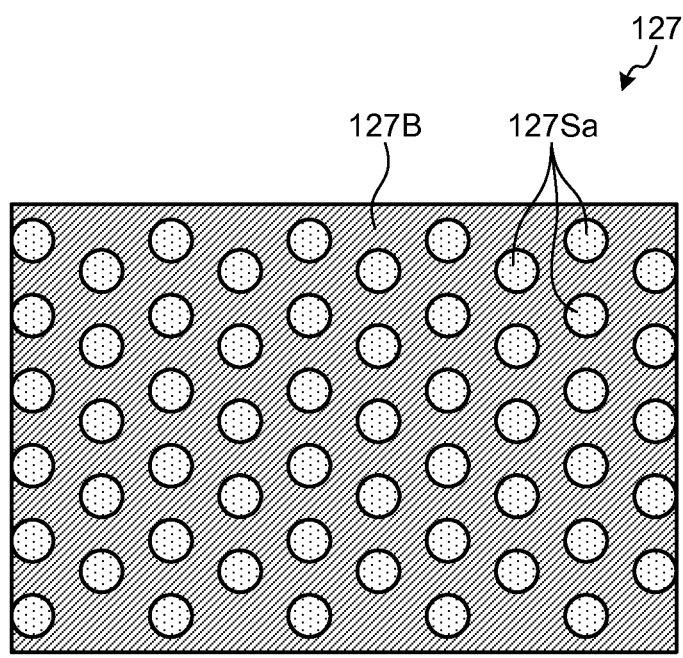
FIG. 12 is a plan view illustrating an example of the anisotropic scattering member.
Figure 13:
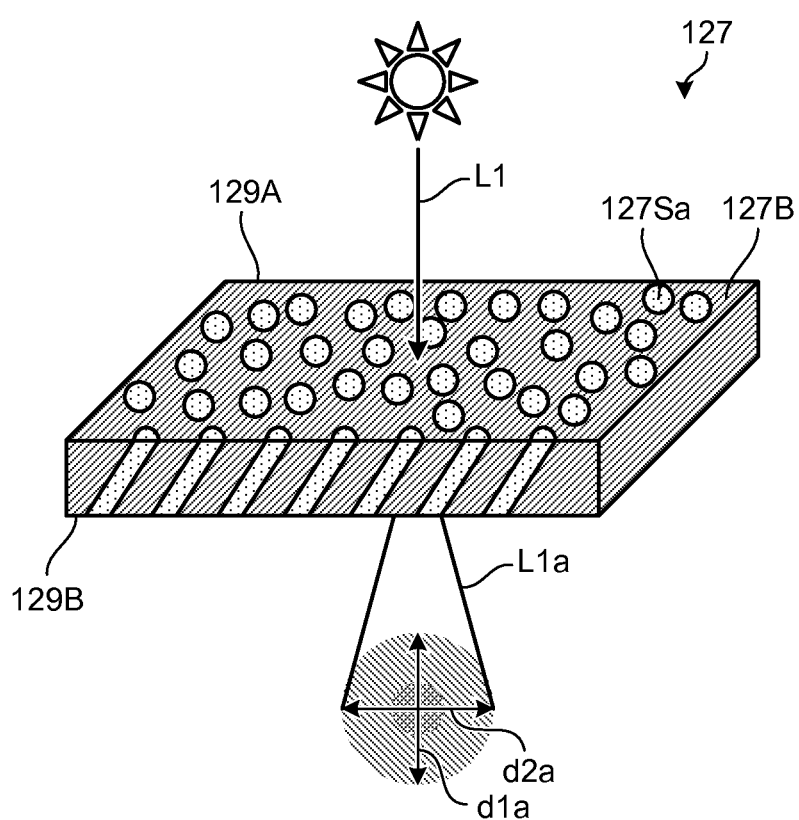
FIG. 13 is a schematic view illustrating a function of the anisotropic scattering member.
Figure 14:
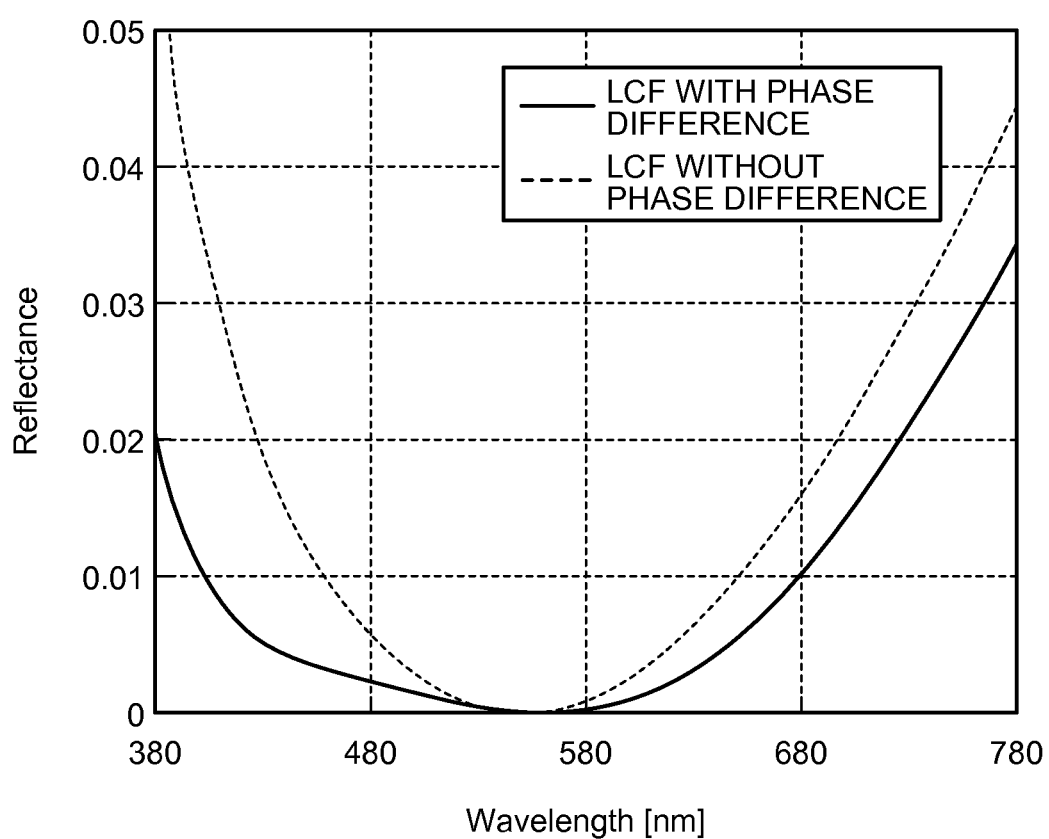
FIG. 14 is a schematic view illustrating a function of the anisotropic scattering member.
Figure 15A:
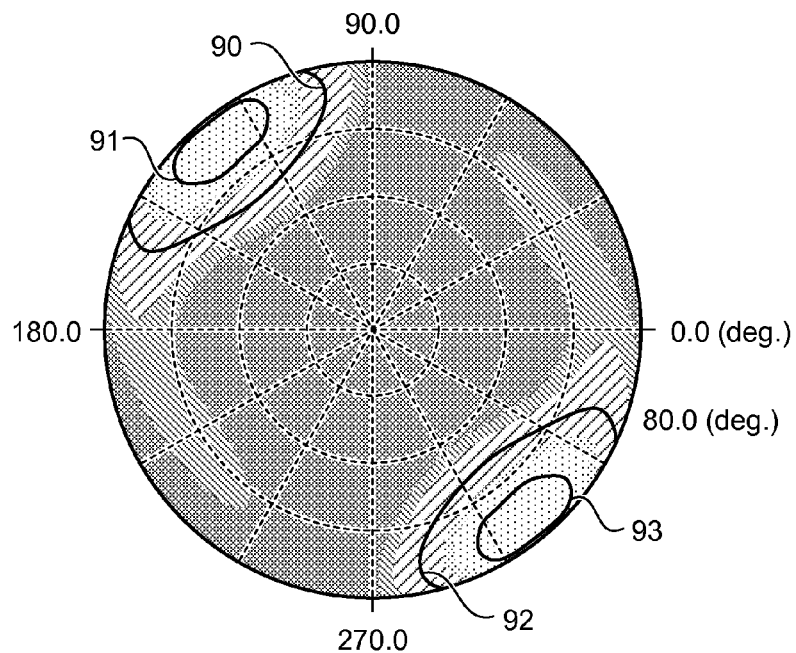
FIG. 15A is a schematic view illustrating a function of the anisotropic scattering member.
Figure 15B:
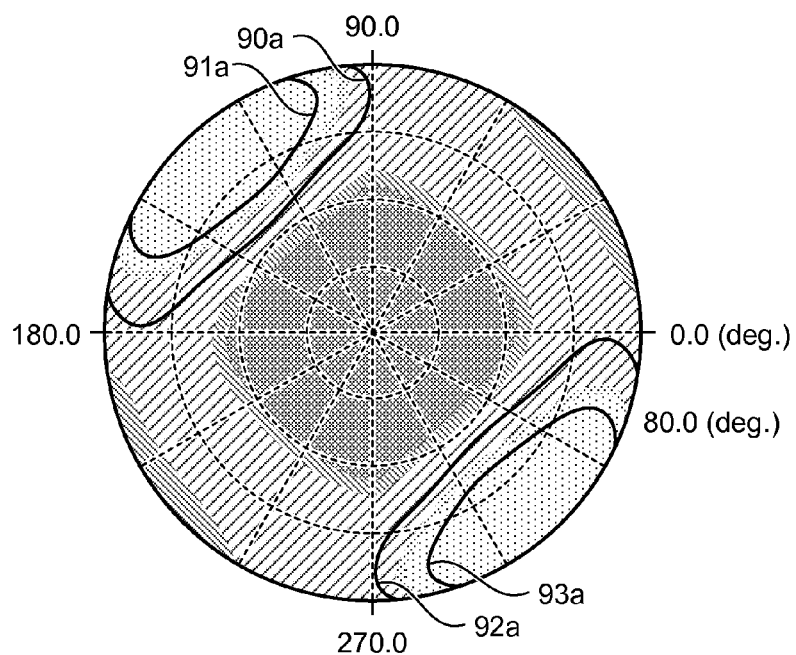
FIG. 15B is a schematic view illustrating a function of the anisotropic scattering member.

FIG. 10 is a schematic view illustrating the relation between the refractive index of the anisotropic scattering member and the refractive index of the liquid crystal layer. FIG. 11 is a schematic view illustrating an example of an optical design of the reflective liquid crystal display device. FIG. 12 is a plan view illustrating an example of the anisotropic scattering member. FIG. 13 is a schematic view illustrating the function of the anisotropic scattering member. FIG. 14 is a schematic view illustrating the function of the anisotropic scattering member. FIG. 15A is a schematic view illustrating the function of the anisotropic scattering member. FIG. 15B is a schematic view illustrating the function of the anisotropic scattering member.

The reflective liquid crystal display device 1 includes a sheet-like anisotropic scattering member 27 for scattering light at a position to which the light reflected from the reflective electrode 15 travels beyond the liquid crystal layer 30. Specifically, the reflective liquid crystal display device 1 has the anisotropic scattering member 27 between the second substrate 23 and the quarter wave (¼ wave) plate 24. The anisotropic scattering member 27 is an anisotropic layer to scatter the light reflected from the reflective electrode 15. For example, a light control film (LCF) may be used as the anisotropic scattering member 27.

The anisotropic scattering member 27 is an anisotropic scattering layer for scattering the light entered from a specific direction. The anisotropic scattering member 27 is arranged relative to the second substrate 23 so that the light entered from a specific direction of a polarization plate 26 side is transmitted with no or little scattering and the light reflected from the reflective electrode 15 is considerably scattered.

As illustrated in FIGS. 6A to 6D and 7, the anisotropic scattering member 27 includes two types of regions (a first refractive index region 27B and a second refractive index region 27S) having different refractive indexes. As illustrated in FIG. 7, the anisotropic scattering member 27 has a louver-like structure in which a plurality of plate-shaped second refractive index regions 27S are disposed at predetermined intervals in the first refractive index region 27B. In the present embodiment, the first refractive index region 27B is made of material of which refractive index is lower than that of the second refractive index region 27S. That is, the first refractive index region 27B is made of material having relatively low refractive index in the anisotropic scattering member 27, and is a low refractive index region. The second refractive index region 27S is made of material having relatively high refractive index in the anisotropic scattering member 27, and is a high refractive index region.

For example, in the anisotropic scattering member 27, the first refractive index region 27B and the second refractive index region 27S extend in the thickness direction and incline to a predetermined direction. Depending on the situation, it is possible to arrange the angle so that the angle continuously changes in the in-plane or surface direction. For example, the anisotropic scattering member 27 is formed by obliquely irradiating a resin sheet with ultraviolet rays, the resin sheet being a composite or mixture of two or more types of photopolymerizable monomers or oligomers of which refractive indexes are different from each other. Material usable as the first refractive index region 27B and the second refractive index region 27S will be described later. The anisotropic scattering member 27 may have a structure different from the above, and may be manufactured in a method different from the above. The anisotropic scattering member 27 may include one layer or a plurality of layers. In a case where the anisotropic scattering member 27 includes a plurality of layers, the layers may have the same structure or may have different structures from each other.

The following describes a method for manufacturing the anisotropic scattering member 27 with reference to FIG. 6A. FIG. 6A is schematic view for explaining a method for manufacturing the anisotropic scattering member according to the embodiment. The anisotropic scattering member 27 can be manufactured by: coating a base substance, such as a polyethylene terephthalate (PET) film, with a photo reactive composition to obtain a base material; and irradiating the base material with light obliquely from a light irradiation device through a mask 60 having openings 61, for example. In some cases, the base material may be irradiated with light without using the mask 60. The surface of the base material irradiated with the light output from the light irradiation device is referred to as A-surface, whereas the side opposite thereto is referred to as a B-surface.

Influences of diffraction of light, light absorption caused by the composition, and other factors qualitatively facilitate photoreaction in the composition at a portion closer to the light irradiation side. As a result, the A-surface (a first surface 29A described later) irradiated with the light is a surface in which a change in the refractive index occurring near the boundary between the low refractive index area 27B and the high refractive index area 27S is relatively large as illustrated in FIG. 6A. By contrast, the B-surface (a second surface 29B described later) opposite thereto is a surface in which a change in the refractive index occurring near the boundary between the low refractive index area 27B and the high refractive index area 27S is relatively small.

By adjusting the angle of the irradiation light, it is possible to set the angle α of the boundary between the low refractive index area 27B and the high refractive index area 27S with respect to the thickness direction (Z-direction) of the anisotropic scattering member 27 to various angles in the anisotropic scattering member 27. By adjusting the interval between the irradiation positions of the irradiation pattern, it is possible to adjust the interval between the boundaries of the low refractive index area 27B and the high refractive index area 27S and the interval between the high refractive index area 27S and the high refractive index area 27S, for example.

While the high refractive index area 27S is described as an area in which a base material causes photoreaction, this is given as an example only. The area in which the base material causes photoreaction may be the low refractive index area 27B. The angle α is set to a preferable value as appropriate depending on specifications of the anisotropic scattering member 27, for example. In some cases, the angle α may be set to 0 degree.

FIG. 6B is a cross-sectional view illustrating an anisotropic scattering member. As illustrated in FIG. 6B, if light enters the anisotropic scattering member 27 in a direction substantially along the direction in which the boundary between the low refractive index area 27B and the high refractive index area 27S extends, the light exits as scattered light from the anisotropic scattering member 27. By contrast, if light enters the anisotropic scattering member 27 in a direction substantially perpendicular to the direction in which the boundary between the low refractive index area 27B and the high refractive index area 27S extends, the light passes through the anisotropic scattering member 27 without scattering.

When the external light L1 enters the anisotropic scattering member 27 from a predetermined direction relative to the second substrate 23, the anisotropic scattering member 27 scatters the entered light. On the other hand, when the external light L2 enters the anisotropic scattering member 27 from another predetermined direction relative to the second substrate 23, the anisotropic scattering member 27 transmits the entered light. Furthermore, the transmitted light is at least partially reflected by the reflective electrode 15 and the reflected light enters again the anisotropic scattering member 27. The anisotropic scattering member 27 scatters such a returned light, which has been reflected from the reflective electrode 15, in a predetermined range around a scattering center (scattering axis). The external light L2 is parallel light which enters the polarization plate 26 attached to the second substrate 23. The external light L2 may be non-polarized light or may be polarized light. When the light enters the anisotropic scattering member 27 from an opposite direction from the external light L1 or L2, the scattering member scatters the light from a predetermined direction relative to the second substrate 23 and transmits the light from another predetermined direction relative to the second substrate 23. Specifically, when the light L3 enters the anisotropic scattering member 27 from a predetermined direction relative to the second substrate 23, the entered light is scattered. When the light L4 enters the anisotropic scattering member 27 from another predetermined direction relative to the second substrate 23, the entered light is transmitted. The predetermined directions of L1 and L3 are the same direction except that they are reversed by 180 degrees from each other. The predetermined directions of L2 and L4 have the similar relationship to that of L1 and L3. The light may be scattered at any time while the light passes through the scattering member 27. For example, the light may be scattered when the light enters the anisotropic scattering member 27 or may be scattered when the light exits the anisotropic scattering member 27 or may be scattered while the light travels inside the anisotropic scattering member 27.

Now, an explanation will be made on a relationship among the first surface (A-surface), the second surface (B-surface), and light behavior.

FIG. 6C is a schematic sectional view illustrating the reflective image display unit according to the embodiment. As illustrated in FIG. 6C, an incident light entered from outside is formed into a linear polarized light with a predetermined direction through the polarizing plate 26. After that, the linear polarized light is formed into a circular polarized light through the half-wave plate 25 and the quarter-wave plate 24. A combination of the half-wave plate 25 and the quarter-wave plate 24 functions as a broadband quarter-wave plate. The circular polarized light enters the anisotropic scattering member 27 from a direction orthogonal or almost orthogonal to a direction in which a boundary between the low refractive index area 27B and the high refractive index area 27S extends. Therefore, the circular polarized light passes through the anisotropic scattering member 27 without scattering, then passes through the liquid crystal material layer 30, and reaches the reflecting electrode 15 formed on the first substrate 14. The light is reflected on the reflecting electrode 15 and passes through the liquid crystal material layer 30. Thus, the light enters from A-surface and exits from B-surface of the anisotropic scattering member 27. Since the light enters the anisotropic scattering member 27 from a direction along or substantially along a direction in which a boundary between the low refractive index area 27B and the high refractive index area 27S extends, the light exits as scattered light from the scattering member 27. However, since the scattered light exits from a surface where an extent of refractive index difference at a boundary or vicinity thereof between the low refractive index area 27B and the high refractive index area 27S is relatively small, the iridescence caused by optical interference due to a microstructure is reduced. Then, the scattered light reaches the polarizing plate 26 through the quarter-wave plate 24 and the half-wave plate 25. From the polarizing plate 26, the light emits toward outside. It is possible to control an amount of the light which is reflected by the reflecting electrode 15 and passing through the polarizing plate 26, by controlling an electric voltage applied to the reflecting electrode 15 or the like and thus controlling the alignment state of the liquid crystal molecular in the liquid crystal material layer 17.

FIG. 6D is a schematic sectional view illustrating a reflective image display unit according to another embodiment. As illustrated in FIG. 6D, the external light incident from the outside passes through a polarizing plate 26, a half-wave plate 24, and a quarter-wave plate 25, and enters the anisotropic scattering member 27. Unlike FIG. 6C, the anisotropic scattering member 27 is arranged such that the direction in which the boundary between the low refractive index area 27B and the high refractive index area 27S extends is substantially along the incident light. The external light enters an A-surface and exits as scattered light from a B-surface. The light exits as scattered light from the surface in which a change in the refractive index occurring near the boundary between the low refractive index area 27B and the high refractive index area 27S is relatively small. This reduces iridescent coloring due to light interference caused by the microstructure. The light thus scattered passes through a liquid crystal material layer 30, is reflected by reflecting electrode 15 formed on the first substrate 14, and passes through the liquid crystal material layer 30 again. The light is then incident on the B-surface of the anisotropic scattering member 20 and exits from the A-surface. Because the light enters in a direction substantially perpendicular to the direction in which the boundary between the low refractive index area 27B and the high refractive index area 27S extends, the light passes through the anisotropic scattering member 27 without any change. The light passes through the quarter-wave plate 24 and the half-wave plate 25 and reaches the polarizing plate 26. The light then exits to the outside.

The anisotropic scattering member 27 has a louver-like structure. As illustrated in FIG. 8, the external light L1 exits the anisotropic scattering member 27 as the scattered light L1a. The scattered light L1a has an elliptical form having a shorter diameter d1 and a longer diameter d2. The shorter diameter d1 corresponds to a longitudinal direction of the first and second refractive index regions 27B, 27S. The longer diameter d2 corresponds to a shorter side direction of the first and second refractive index regions 27B, 27S, i.e. an alignment direction of the first and second refractive index regions 27B, 27S. In a case where the returned light reflected from the reflecting electrode 15 is scattered, the scattered light also has an elliptical form. Incidentally, in FIG. 8, the first surface of the anisotropic scattering member 27 is denoted by 29A, and the second surface of the anisotropic scattering member 27 is denoted by 29B. In the first surface 29A, the difference of the refractive indexes between the first and second refractive index regions is relatively high. In the second surface 29B, the difference of the refractive indexes between the first and second refractive index regions is relatively low. When such a scattering member 27 is mounted on the display device according to the present embodiment, the second surface 29B may be a lower side or may be an upper side so long as the scattering light is emitted from the second surface 29B.

It is preferable that the scattering center of the anisotropic scattering member 27 is directed to a main view angle direction. The scattering center may be directed to a direction other than the main view angle direction. In any case, the scattering center is arranged so that brightness or luminance in a main view angle direction becomes maximum (i.e. the reflection ratio becomes highest) due to the effect of the anisotropic scattering member 27 when used. The main view angle direction corresponds to a direction from which a user views a video display screen (image display surface) of the reflective liquid crystal display device 1 when using the device 1. In a case where the video display screen has a rectangular shape, the main view angle corresponds to a direction orthogonal to an edge or side of the rectangular video display screen nearest to the user.

The anisotropic scattering member 27 gives a phase difference in a certain direction to the external light entering the anisotropic scattering member 27. Specifically, the external light L2 entering the anisotropic scattering member 27 is output as a polarized light with a certain phase difference from the external light L2. As illustrated in FIG. 9, in the anisotropic scattering member 27, an alignment direction of the first and second refractive index regions 27B, 27S is referred to as X-axis direction, a direction orthogonal to the X-axis direction in a plane which exits a largest area of the anisotropic scattering member 27 is referred to as Y-axis direction, and a direction orthogonal to both the X-axis direction and the Y-axis direction is referred to as Z-axis direction. Herein, the X-axis direction and the Y-axis direction are directions along which pixels are arrayed. In such a situation, the refractive index of the anisotropic scattering member 27 is represented by an ellipsoidal shape 42 as illustrated in FIG. 10. In FIG. 10, "nx" represents a refractive index in the X-axis direction, "ny" represents a refractive index in the Y-axis direction, and "nz" represents a refractive index in the Z-axis direction. In the ellipsoidal shape 42, the refractive index nz is lower than the refractive index nx and lower than the refractive index ny. Also in the ellipsoid shape 42, the refractive index ny is lower than the refractive index nx. In other words, the anisotropic scattering member 27 has a function of positive A-plate and a function of negative C-plate with a relationship nx>ny>nz. Furthermore, in the anisotropic scattering member 27, the X-axis direction is a slow axis 40 (FIG. 9). In this case, the light entering the first surface 29A inclines along the alignment direction of the first and second refractive index regions 27B, 27S, which is the X-axis direction.

In the reflective liquid crystal display device 1, the liquid crystal layer 30 also has the refractive indexes different in each axis directions. Specifically, in the liquid crystal layer 30 during its turned-on state with voltage applied, the distribution of refractive index has an ellipsoidal shape 44. Specifically, in the liquid crystal layer 30, the refractive index nx in the X-axis direction, the refractive index ny in the Y-axis direction, and the refractive index nz in the Z-axis direction have the relationship nx<ny<nz.

Thus, in the reflective liquid crystal display device 1, the refractive index distribution of the liquid crystal layer 30 having the ellipsoidal shape 44 is complemented by the refractive index distribution of the anisotropic scattering member 27 having the ellipsoidal shape 42, so that the refractive index distribution of the device 1 approaches a spherical shape. Thereby, the anisotropic scattering member 27 has a function to compensate the view angle in addition to a function to improve the brightness or luminance of the screen by scattering the light. Therefore, the reflective liquid crystal display device 1 can compensate the view angle even without an independent view angle compensation film. Thus, it is possible for the reflective liquid crystal display device 1 to reduce the number of layers, and thereby reduce the thickness thereof. The anisotropic scattering member 27 of the present embodiment has a refractive index distribution having a function of the positive A-plate and a function of the negative C-plate. However, this is not exclusive. The refractive index distribution of the anisotropic scattering member 27 may be adjusted depending on the refractive index distribution of the liquid crystal layer 30. For example, in a case where the refractive index distribution of the liquid crystal layer 30 has a negative C-plate, the refractive index distribution of the anisotropic scattering member 27 may have a positive C plate.

FIG. 11 is a schematic view illustrating an example of optical design of the reflective liquid crystal display device. FIG. 11 illustrates axis directions of the liquid crystal cell (the liquid crystal layer 30) and the components of second panel unit 20, respectively. Specifically, in FIG. 11, with regard to the second panel unit 20, there are illustrated an absorption axis of the polarization plate 26, a slow axis of the anisotropic scattering member 27, a slow axis of the half wave plate 25, and a slow axis of the quarter wave plate 24. In FIG. 11, with regard to the liquid crystal cell, there are illustrated alignment directions of its TFT substrate side and its CF substrate side, respectively. The alignment direction includes, but not limited to, a rubbing direction, a photo-alignment direction, or the like.

In the reflective liquid crystal display device 1, since the phase difference is applied by the anisotropic scattering member, it is possible to adjust the phase difference of the anisotropic scattering member 27 on designing the optical system as illustrated in FIG. 11. Thereby, the flexibility in designing the optical system of the reflective liquid crystal display device 1 can be improved, in comparison to the case where the phase difference is not applied by the anisotropic scattering member 27. Furthermore, it is possible to improve the display contrast by employing components for applying the phase difference.

The anisotropic scattering member 27 of the present embodiment has a louver-like structure. However, this is not exclusive. In an anisotropic scattering member 127 as illustrated in FIG. 12, column-like second refractive index regions 127S$a$ are disposed in a first refractive index region 127B. Thus, the second refractive index region 127S$a$ may be formed as a column-shaped. In the anisotropic scattering member 127 as illustrated in FIG. 12, the scattered light L1$a$ from the external light L1 has a circular form as illustrated in FIG. 13. In the circular form, a diameter d1$a$ and a diameter d2$a$ are the same length. When the anisotropic scattering member 127 scatters the returned light reflected from the reflective electrode 15, the scattered light also has a circular form. Incidentally, in FIG. 13, the first surface of the anisotropic scattering member 127 is denoted by 129A, and the second surface of the anisotropic scattering member 127 is denoted by 129B. In the first surface 129A, the difference of the refractive indexes between the first and second refractive index regions is relatively high. In the second surface 129B, the difference of the refractive indexes between the first and second refractive index regions is relatively low. When such a scattering member 127 is mounted on the display device according to the present embodiment, the second surface 129B may be a lower side or may be an upper side so long as the scattering light is emitted from the second surface 129B.

Now, an explanation will be made on functions of the anisotropic scattering member 27 with reference to FIG. 14, FIG. 15A and FIG. 15B. FIG. 14 represents a measurement result of spectral distributions in black display mode when using the anisotropic scattering member 27 (LCF in FIG. 14) with phase difference, and when using the anisotropic scattering member 27 (LCF in FIG. 14) without phase difference. As illustrated in FIG. 14, when the phase difference is given by the anisotropic scattering member 27, the light intensity can be reduced. By lowering the luminance of the black portion, it is possible to improve the contrast between black color and other colors, and thereby make the contrast of image clearer.

FIG. 15A represents a measurement result of a view angle property of black display mode when using the anisotropic scattering member 27 (LCF is used as example) with phase difference. FIG. 15B represents a measurement result of a view angle property of black display mode when using the anisotropic scattering member 27 (LCF is used as example) without phase difference. In FIG. 15A and FIG. 15B, brighter color represents higher luminance. In FIG. 15A, the luminance of the region 90 is higher than the luminance outside of the region 90, and the luminance of the region 91 is higher than the luminance outside of the region 91 (i.e. the region 90). In FIG. 15A, the luminance of the region 92 is higher than the luminance outside of the region 92, and the luminance of the region 93 is higher than the luminance outside of the region 93 (i.e. the region 92). Similarly, in FIG. 15B, the luminance of the region 90$a$ is higher than the luminance outside of the region 90$a$, and the luminance of the region 91$a$ is higher than the luminance outside of the region 91$a$ (i.e. the region 90$a$). In FIG. 15B, the luminance of the region 92$a$ is higher than the luminance outside of the region 92$a$, and the luminance of the region 93$a$ is higher than the luminance outside of the region 93$a$ (i.e. the region 92$a$). As illustrated in FIG. 15A and FIG. 15B, the regions 90, 91, 92, 93 are smaller than the corresponding regions 90$a$, 91$a$, 92$a$, 93$a$, respectively. Therefore, by giving a phase difference with the anisotropic scattering member 27 (e.g. LCF), the view angle can be widened. Namely, it is possible to compensate the view angle.

Now, an explanation will be made on materials which can be used as the anisotropic scattering member 27. Specifically, a combination of the first refractive index region 27B and the second refractive index region 27S capable of generating the refractive index difference and capable of generating the phase difference will be explained. More specifically, a combination of materials used for the lower refractive index region (lower refractive index materials) and materials used for the higher refractive index region (higher refractive index materials) will be explained.

By using a material having an easily orientable side chain as at least one of the lower refractive index material and the higher refractive index material, the anisotropic scattering member 27 can provide a phase difference. As the lower refractive index material, it is possible to use materials in which acrylic resin represented by Chemical Formula 1 is used as a main chain and silicon acrylate represented by Chemical Formula 2 is used as the side chain. As R1 and R2 of the silicon acrylate represented by Chemical Formula 2, methyl group (—CH$_3$) or hydrogen (—H) can be used.

[Chemical Formula 1]

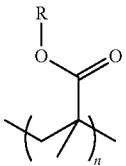

[Chemical Formula 2]

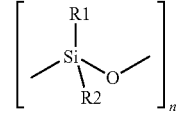

By using the silicon acrylate as the side chain, orientation can be easily performed as compared to a hydrocarbon system to generate the phase difference. The phase difference can be controlled by adjusting a mixing ratio between the silicon acrylate in the side chain and the aliphatic acrylate.

When R1 and R2 of a silicone side chain used as the side chain are both methyl group (—CH₃), helix orientation can be easily performed as represented by Chemical Formula 3 below.

[Chemical Formula 3]

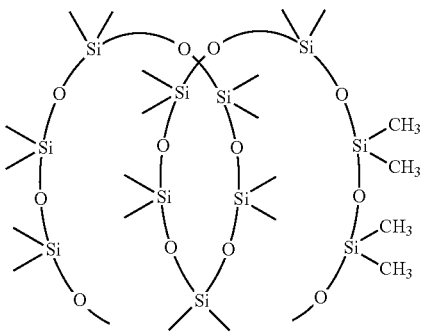

When R1 and R2 of the silicone side chain used as the side chain are both hydrogen (—H), linear orientation can be easily performed as represented by Chemical Formula 4 and Chemical Formula 5 below.

[Chemical Formula 4]

[Chemical Formula 5]

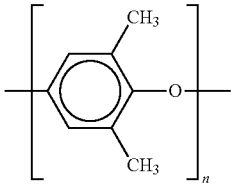

As the high refractive index material, it is possible to use materials in which the acrylic resin represented by Chemical Formula 1 described above is used as the main chain, and a polymer to which a benzene ring is introduced is used as the side chain. Specifically, by introducing a side chain using characteristics of a liquid crystal polymer as represented by Chemical Formula 6, Chemical Formula 7, or Chemical Formula 8 as the side chain, the phase difference can be developed.

The phase difference can also be developed by introducing a side chain of an aromatic hydrocarbon as represented by Chemical Formula 9, Chemical Formula 10, Chemical Formula 11, Chemical Formula 12, Chemical Formula 13, Chemical Formula 14, Chemical Formula 15, Chemical Formula 16, or Chemical Formula 17. In this case, aromatics in the side chains are stacked, so that a high phase difference can be developed.

[Chemical Formula 9]

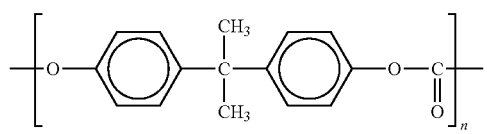

[Chemical Formula 10]

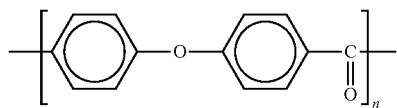

[Chemical Formula 11]

[Chemical Formula 12]

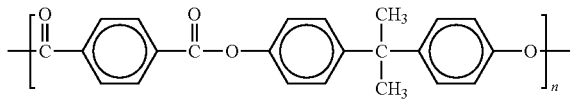

[Chemical Formula 13]

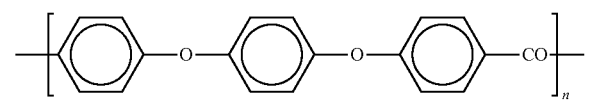

[Chemical Formula 14]

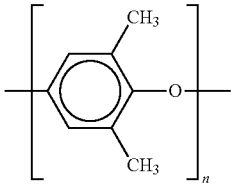

[Chemical Formula 6]

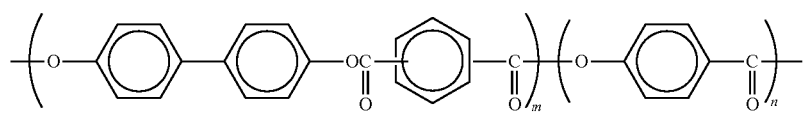

[Chemical Formula 7]

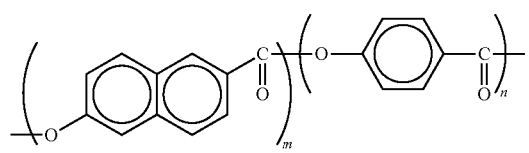

[Chemical Formula 8]

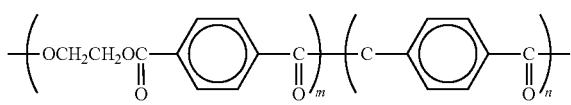

[Chemical Formula 15]

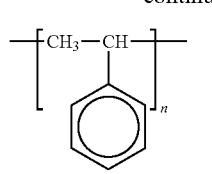

[Chemical Formula 16]

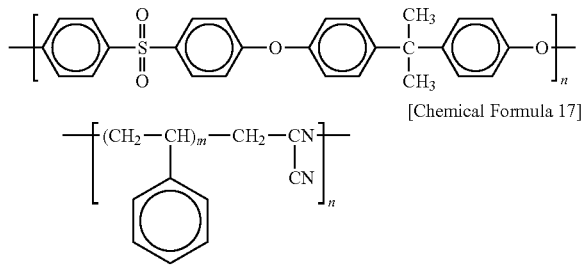

[Chemical Formula 17]

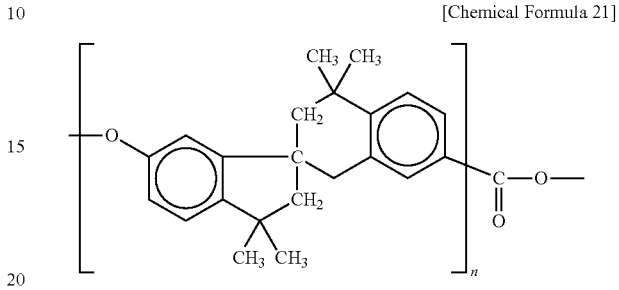

As the side chain, a cardo structure and/or a spiro ring is preferably introduced in addition to or in place of the liquid crystal polymer and the aromatic hydrocarbon described above. Introducing the side chain containing the cardo structure and/or the spiro ring as the side chain can prevent the molecule from rotating and a rigid straight chain can be obtained, so that an increase in the phase difference can be prevented. Accordingly, the phase difference can be adjusted to a proper value.

As the side chain containing the cardo structure, it is possible to use a side chain having fluorene skeletons represented by Chemical Formula 18 and Chemical Formula 19 and/or an acenaphthylene skeleton as represented by Chemical Formula 20.

[Chemical Formula 18]

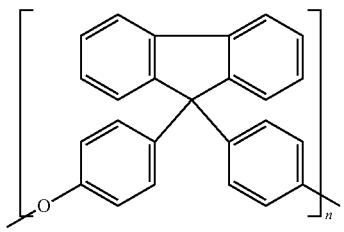

[Chemical Formula 19]

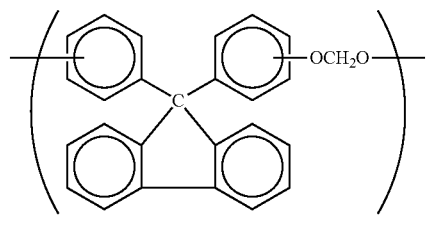

[Chemical Formula 20]

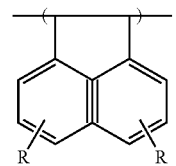

The side chain containing the spiro ring has a structure in which two cyclic compounds share one carbon atom, and the side chain including a structure represented by Chemical Formula 21 can be used, for example. By using the side chain containing the spiro ring, high refractive index can be maintained at an aromatic moiety, and the aromatics can be prevented from being stacked on each other due to a bulky conformation. This can prevent the phase difference from being too large, so that a proper phase difference can be developed.

[Chemical Formula 21]

<2. Electronic Apparatus>

The reflective LCD device according to the present disclosure described above can be used as a display unit (display device) of an electronic apparatus in various fields for displaying a video signal input to the electronic apparatus or a video signal generated in the electronic apparatus as an image or video.

The reflective LCD device according to the present disclosure is preferably used as a display unit (display device) of a mobile computing device, which is frequently used in the outdoors, among electronic apparatuses in various fields. Examples of the mobile computing device include, but are not limited to, a mobile information device such as digital camera, a video camera, a personal digital assistant (PDA), a game machine, a notebook-type personal computer, and an electronic book, a tablet, and a mobile communication device such as mobile phone.

As is clear from the description of the embodiment above, the reflective liquid crystal display device according to the present disclosure can achieve transmissive display while maintaining reflection display performance equivalent to that of the reflective display device, so that the reflective liquid crystal display device can sufficiently exhibit a characteristic thereof such that power consumption is low and a screen is easily viewed under a bright environment. Accordingly, used as a display unit of electronic apparatuses in various fields, especially, of a portable electronic apparatus, the reflective liquid crystal display device according to the present disclosure can greatly contribute to reduction in power consumption of the portable electronic apparatus.

An explanation will now be made on an electronic apparatus provided with the reflective LCD device according to the present disclosure as a display unit. Specifically, concrete examples of the electronic apparatus according to the present disclosure will be explained.

Figure 16A:
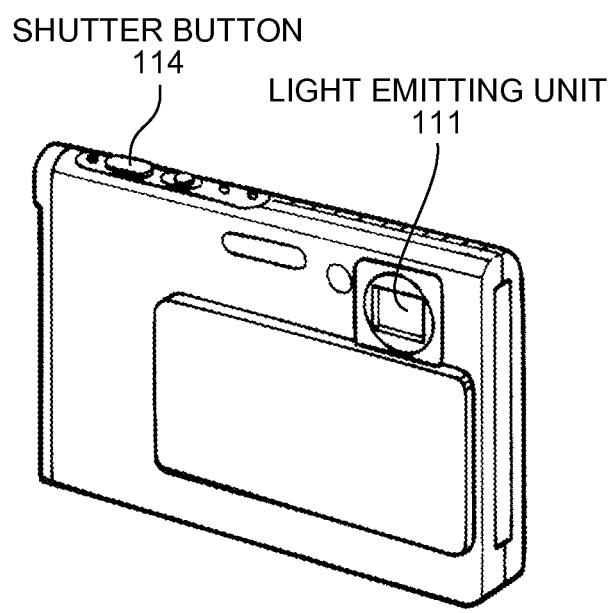
FIG. 16A is a perspective view illustrating an appearance of a digital camera to which the present disclosure is applied.
Figure 16B:
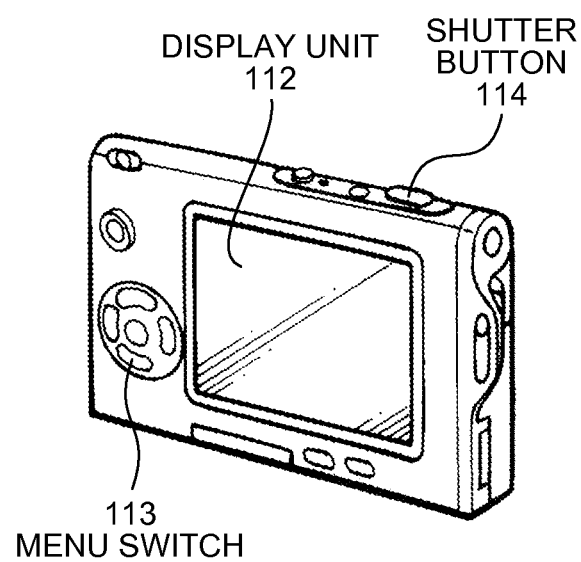
FIG. 16B is a perspective view illustrating an appearance of a digital camera to which the present disclosure is applied.

FIG. 16A illustrates a perspective view viewed from the front side of the appearance of a digital camera to which the present disclosure is applied, and FIG. 16B is a perspective view viewed from the back side thereof. The digital camera according to the present application example includes a flash light emitting unit 111, a display unit 112, a menu switch 113, and a shutter button 114, and the reflective liquid crystal display device according to the present disclosure is used as the display unit 112.

Figure 17:
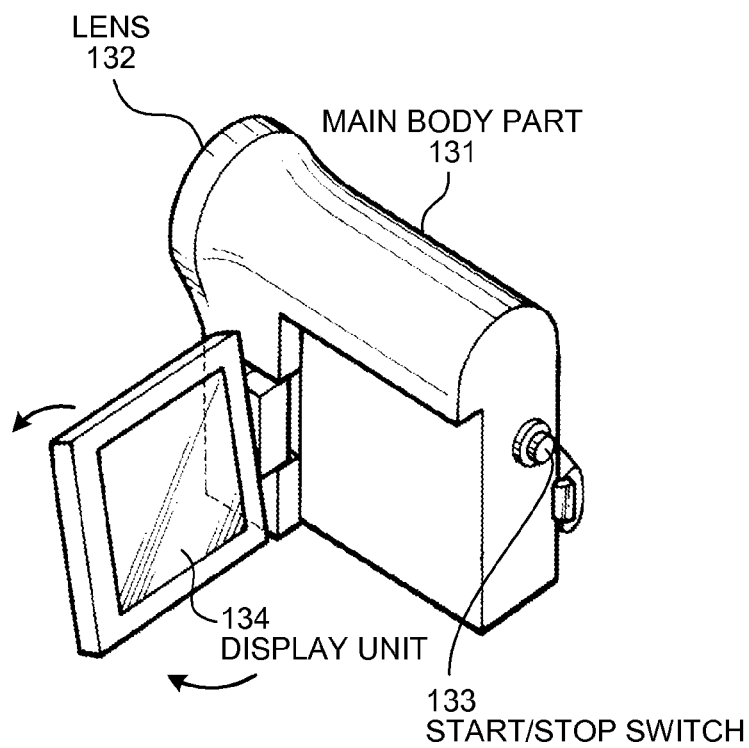
FIG. 17 is a perspective view illustrating an appearance of a video camera to which the present disclosure is applied.

FIG. 17 is a perspective view illustrating the appearance of a video camera to which the present disclosure is applied.

The video camera according to the application example includes a main body part 131, a lens 132 arranged at a side surface directed frontward for photographing a subject, a start/stop switch 133 for photographing, and a display unit 134, and the reflective liquid crystal display device according to the present disclosure is used as the display unit 134.

Figure 18:
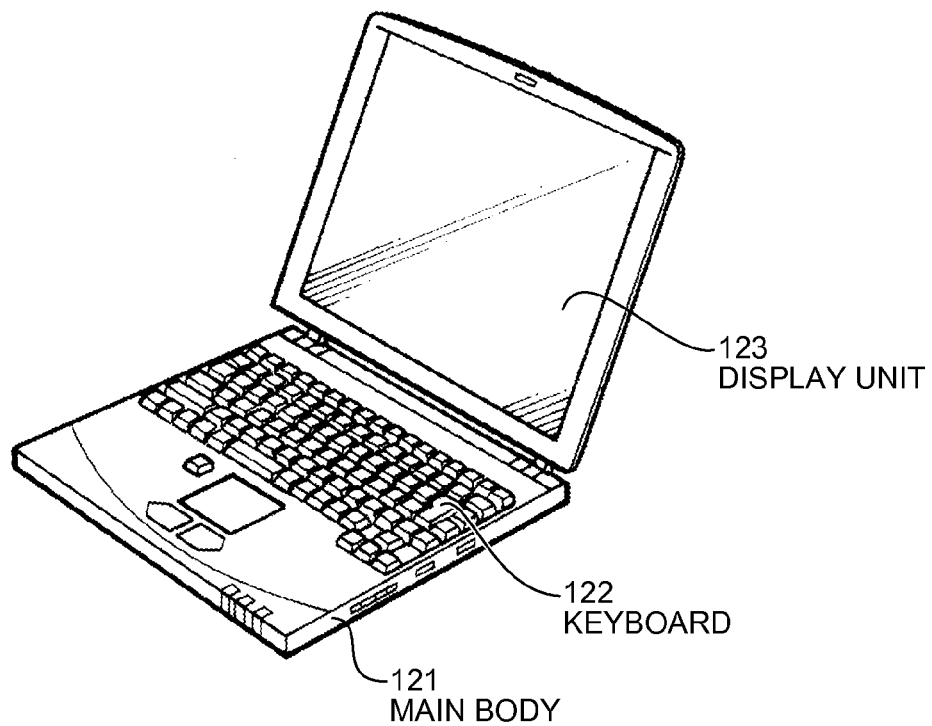
FIG. 18 is a perspective view illustrating an appearance of a notebook-type personal computer to which the present disclosure is applied.

FIG. 18 is a perspective view illustrating the appearance of a notebook-type personal computer to which the present disclosure is applied. The notebook-type personal computer according to the application example includes a main body 121, a keyboard 122 that is operated to input characters and the like, and a display unit 123 that displays an image, and the reflective liquid crystal display device according to the present disclosure is used as the display unit 123.

Figure 19A:
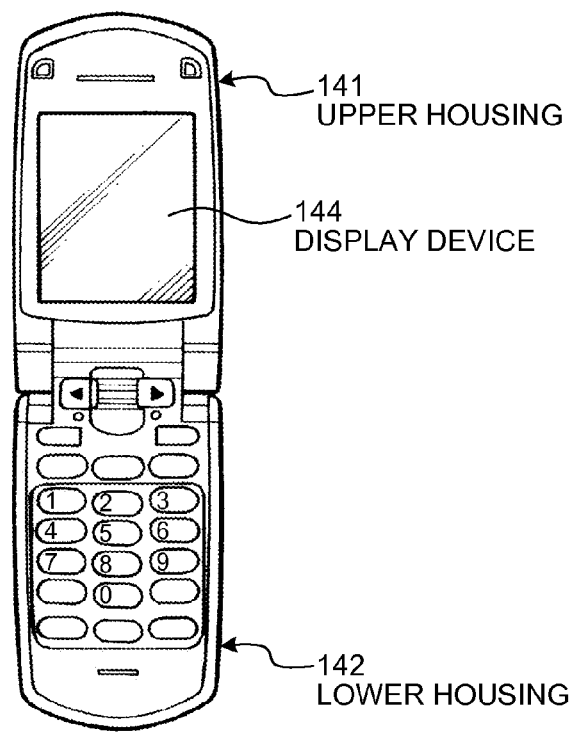
FIG. 19A is a front view illustrating a mobile phone in an open state to which the present disclosure is applied.
Figure 19B:
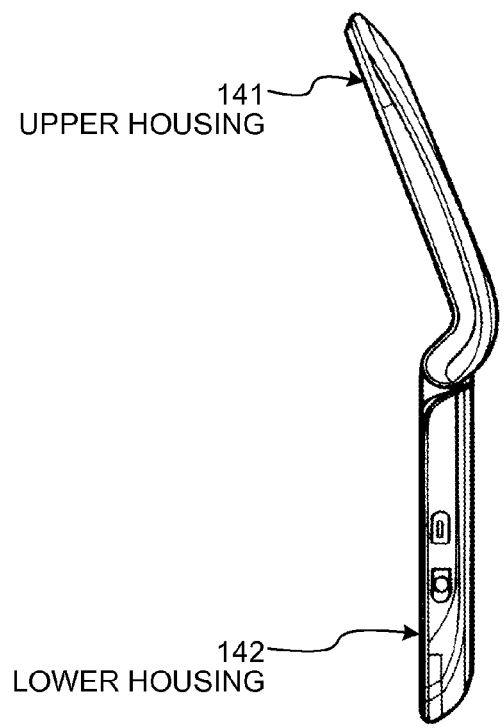
FIG. 19B is a side view illustrating the mobile phone to which the present disclosure is applied.
Figure 19C:
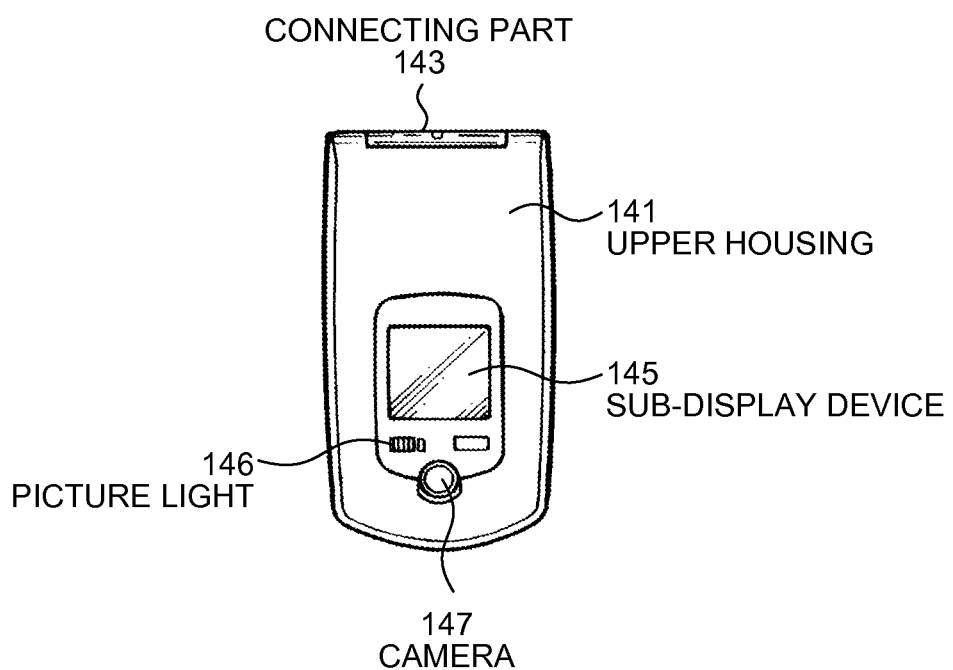
FIG. 19C is a front view illustrating the mobile phone in a closed state to which the present disclosure is applied.
Figure 19D:
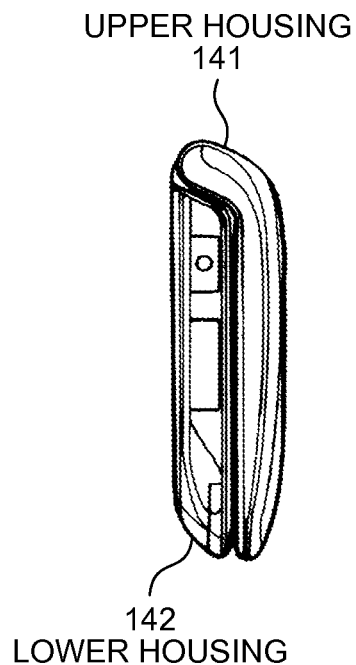
FIG. 19D is a left side view illustrating the mobile phone to which the present disclosure is applied.
Figure 19E:
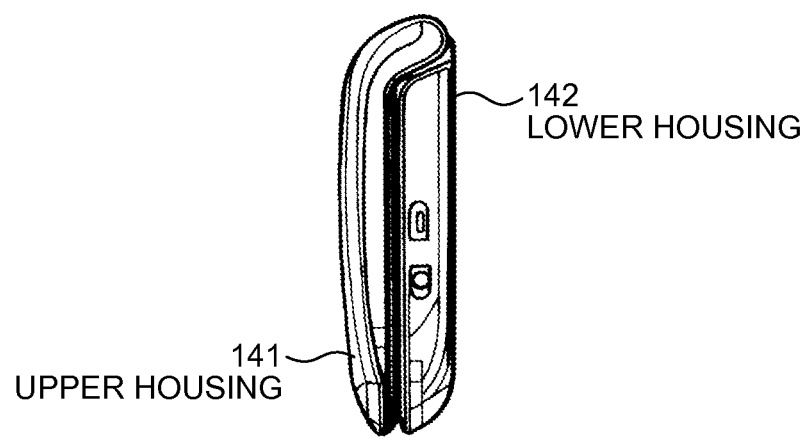
FIG. 19E is a right side view illustrating the mobile phone to which the present disclosure is applied.
Figure 19F:
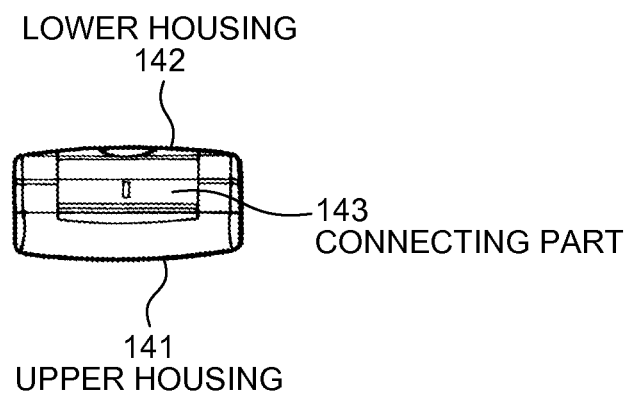
FIG. 19F is a top view illustrating the mobile phone to which the present disclosure is applied.
Figure 19G:
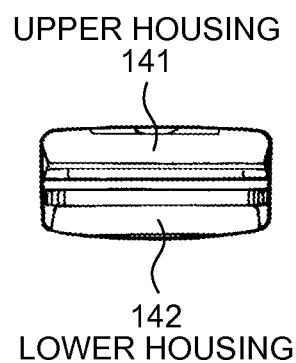
FIG. 19G is a bottom view illustrating the mobile phone to which the present disclosure is applied.

FIG. 19A to FIG. 19G are outline drawings illustrating a portable communication apparatus to which the present disclosure is applied, such as a mobile phone. FIG. 19A is a front view thereof in an open state, FIG. 19B is a side view thereof, FIG. 19C is a front view thereof in a closed state, FIG. 19D is a left side view thereof, FIG. 19E is a right side view thereof, FIG. 19F is a top view thereof, and FIG. 19G is a bottom view thereof.

The mobile phone according to this application example includes an upper housing 141, a lower housing 142, a connecting part (in this example, a hinge part) 143, a display device 144, a sub-display device 145, a picture light 146, and a camera 147. The mobile phone according to this application example is manufactured by using the reflective liquid crystal display device according to the present disclosure as the display device 144 and the sub-display device 145.

According to the present disclosure, it is possible to improve the contrast and make the device or apparatus thinner by using a scattering film having a phase difference.

<3. Configuration of Present Disclosure>

The present disclosure can take the following configurations.

(1) A reflective liquid crystal display device comprising:
a first substrate provided with a reflective electrode;
a second substrate provided with a transparent electrode, the transparent electrode oppositely disposed to the reflective electrode and formed for each of a plurality of pixels;
a liquid crystal layer disposed between the first substrate and the second substrate; and
an anisotropic scattering member formed on the second substrate, wherein
the anisotropic scattering member has first and second surfaces each including a first refractive index region and a second refractive index region, the first refractive index region having a refractive index different from that of the second refractive index region, wherein
a refractive index difference between the first refractive index region and the second refractive index region in the first surface is larger than that in the second surface, and
the anisotropic scattering member is disposed so that light enters from the first surface thereof and the light exits as scattered light from the second surface thereof, and
a phase difference is given to the light entered the anisotropic scattering member.

(2) The reflective liquid crystal display device according to (1), wherein the anisotropic scattering member has a slow axis in a direction parallel to an incline direction along which the light entered from the first surface inclines.

(3) The reflective liquid crystal display device according to (1), wherein
when a voltage is applied to a drive electrode and the transparent electrode,
in the liquid crystal layer, a refractive index in X-axis direction is lower than a refractive index in Z-axis direction and a refractive index in Y-axis direction is lower than the refractive index in the Z-axis direction, and
in the anisotropic scattering member, a refractive index in the X-axis direction is higher than a refractive index in the Z-axis direction and a refractive index in the Y-axis direction is higher than the refractive index in the Z-axis direction, wherein
the X-axis direction is a direction along which pixels are arrayed,
the Y-axis direction is a direction along which pixels are arrayed, and orthogonal to the X-axis direction, and
the Z-axis direction is orthogonal to the X-axis direction and the Y-axis direction.

(4) The reflective liquid crystal display device according to (3), wherein
the anisotropic scattering member has a slow axis in a direction parallel to an incline direction along which the light entered from the first surface inclines, wherein
the incline direction is the X-axis direction, and
in the anisotropic scattering member, the refractive index in the X-axis direction is higher than the refractive index in the Y-axis direction.

(5) An electronic apparatus provided with the reflective liquid crystal display device according to (1).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A reflective liquid crystal display device comprising:
a first substrate provided with a reflective electrode;
a second substrate provided with a transparent electrode, the transparent electrode oppositely disposed to the reflective electrode and provided for each of a plurality of pixels;
a liquid crystal layer disposed between the first substrate and the second substrate; and
an anisotropic scattering member provided on the second substrate, wherein:
the anisotropic scattering member comprises a first surface and a second surface, the anisotropic scattering member includes a first refractive index region and a second refractive index region having a refractive index different from that of the first refractive index region,
a refractive index difference between the first refractive index region and the second refractive index region at the first surface is larger than a refractive index difference between the first refractive index region and the second refractive index region at the second surface,
the anisotropic scattering member is disposed so that light enters from the first surface and the light exits as scattered light from the second surface, and
a phase difference is given to the light entered the anisotropic scattering member, and
when a voltage is applied to a drive electrode and the transparent electrode, in the liquid crystal layer, a refractive index in an X-axis direction is lower than a refractive index in a Z-axis direction and a refractive index in a Y-axis direction is lower than the refractive index in the Z-axis direction, and in the anisotropic scattering member, a refractive index in the X-axis direction is higher than a refractive index in the Z-axis direction and a refractive index in the Y-axis direction is higher than the refractive index in the Z-axis direction, wherein:

the X-axis direction is a direction along which pixels are arrayed, the Y-axis direction is a direction along which pixels are arrayed, and orthogonal to the X-axis direction, and the Z-axis direction is orthogonal to the X-axis direction and the Y-axis direction.

2. The reflective liquid crystal display device according to claim 1, wherein the anisotropic scattering member comprises a slow axis in a direction parallel to an incline direction along which the light entered from the first surface inclines.

3. The reflective liquid crystal display device according to claim 1, wherein the anisotropic scattering member has a slow axis in a direction parallel to an incline direction along which the light entered from the first surface inclines, wherein the incline direction is the X-axis direction, and in the anisotropic scattering member, the refractive index in the X-axis direction is higher than the refractive index in the Y-axis direction.

4. An electronic apparatus provided with the reflective liquid crystal display device according to claim 1.

5. The reflective liquid crystal display device according to claim 1, wherein each of the first refractive index region and the second refractive index region extends in a thickness direction from the first surface to the second surface and is inclined at a predetermined angle with respect to the first surface or the second surface.

6. The reflective liquid crystal display device according to claim 1, wherein the phase difference is given by the anisotropic scattering member.

7. The reflective liquid crystal display device according to claim 1, wherein the anisotropic scattering member comprises a plurality of refractive index regions formed of the second material, wherein the plurality of refractive index regions formed of the second material are disposed at predetermined intervals in the first refractive index region.

8. A reflective liquid crystal display device comprising:
a first substrate provided with a reflective electrode;
a second substrate provided with a transparent electrode, the transparent electrode oppositely disposed to the reflective electrode and provided for each of a plurality of pixels;
a liquid crystal layer disposed between the first substrate and the second substrate; and
an anisotropic scattering member provided on the second substrate, wherein:
the anisotropic scattering member comprises a first surface and a second surface, the anisotropic scattering member includes a first refractive index region and a second refractive index region having a refractive index different from that of the first refractive index region, a refractive index difference between the first refractive index region and the second refractive index region at the first surface is larger than a refractive index difference between the first refractive index region and the second refractive index region at the second surface, the anisotropic scattering member is disposed so that light enters from the second surface and the light exits as scattered light from the first surface,
a phase difference is given to the light entered the anisotropic scattering member, and
when a voltage is applied to a drive electrode and the transparent electrode, in the liquid crystal layer, a refractive index in an X-axis direction is lower than a refractive index in a Z-axis direction and a refractive index in a Y-axis direction is lower than the refractive index in the Z-axis direction, and
in the anisotropic scattering member, a refractive index in the X-axis direction is higher than a refractive index in the Z-axis direction and a refractive index in the Y-axis direction is higher than the refractive index in the Z-axis direction, wherein:
the X-axis direction is a direction along which pixels are arrayed, the Y-axis direction is a direction along which pixels are arrayed, and orthogonal to the X-axis direction, and
the Z-axis direction is orthogonal to the X-axis direction and the Y-axis direction.

* * * * *